(12) United States Patent
Gaucher et al.

(10) Patent No.: US 12,090,967 B2
(45) Date of Patent: Sep. 17, 2024

(54) ADAPTER FOR A MOTOR VEHICLE WIPER SYSTEM

(71) Applicant: Valeo Systèmes d'Essuyage, Le Mesnil Saint Denis (FR)

(72) Inventors: Vincent Gaucher, Le Mesnil Saint Denis (FR); Eric Poton, Le Mesnil Saint Denis (FR); Olivier Jomard, Le Mesnil Saint Denis (FR)

(73) Assignee: VALEO SYSTÈMES D'ESSUYAGE, Le Mesnil Saint Denis (FR)

( * ) Notice: Subject to any disclaimer, the term of this patent is extended or adjusted under 35 U.S.C. 154(b) by 0 days.

(21) Appl. No.: 18/026,676

(22) PCT Filed: Sep. 15, 2021

(86) PCT No.: PCT/EP2021/075332
§ 371 (c)(1),
(2) Date: Mar. 16, 2023

(87) PCT Pub. No.: WO2022/058348
PCT Pub. Date: Mar. 24, 2022

(65) Prior Publication Data
US 2023/0339434 A1    Oct. 26, 2023

(30) Foreign Application Priority Data

Sep. 17, 2020 (FR) ........................ 2009449

(51) Int. Cl.
*B60S 1/40* (2006.01)
(52) U.S. Cl.
CPC ............. *B60S 1/407* (2013.01); *B60S 1/4074* (2013.01); *B60S 1/4077* (2013.01)
(58) Field of Classification Search
CPC ...... B60S 1/4067; B60S 1/4074; B60S 1/407; B60S 1/4077; B60S 1/4003
(Continued)

(56) References Cited

U.S. PATENT DOCUMENTS 3,163,877 A * 1/1965 Wubbe .................. B60S 1/4067
  15/250.32
9,333,948 B2 * 5/2016 Depondt ............... B60S 1/4048
(Continued)

FOREIGN PATENT DOCUMENTS

DE       2604325       *  8/1977
FR       2507137 A1    12/1982
(Continued)

OTHER PUBLICATIONS

Machine translation of description portion of German publication 2604325, published Aug. 1977. (Year: 1977).*
(Continued)

*Primary Examiner* — Gary K. Graham
(74) *Attorney, Agent, or Firm* — Osha Bergman Watanabe & Burton LLP

(57) ABSTRACT

Adapter (29) for a connection device (7) configured to connect a wiper blade (3) to a drive arm (5) in a wiper system (1) for a motor vehicle, comprising a first lateral wall (43) and a second lateral wall (45) distant from one another and connected to one another by an upper wall (46), the first lateral wall (43) and the second lateral wall (45) respectively comprising a first orifice (47) and a second orifice (49) which are suitable for receiving a pin (23) extending in a transverse direction (Oy) projecting from the drive arm (5), characterized in that the second lateral wall (45) comprises at least one attachment means (57) for attaching the pin (23) in the second orifice (49) configured to hold the adapter (29) secured to the drive arm (5) at least in the transverse direction (Oy).

7 Claims, 17 Drawing Sheets

(58) Field of Classification Search
USPC .................................................. 15/250.32
See application file for complete search history.

(56) References Cited

U.S. PATENT DOCUMENTS

| | | | |
|---|---|---|---|
| 10,407,029 B2* | 9/2019 | Terrasse ................ | B60S 1/3853 |
| 2003/0163885 A1* | 9/2003 | De Block ............. | B60S 1/3849 |
| | | | 15/250.43 |
| 2013/0185890 A1 | 7/2013 | Ku | |

FOREIGN PATENT DOCUMENTS

| | | |
|---|---|---|
| FR | 2584036 A1 | 1/1987 |
| JP | S63-168307 U | 11/1988 |
| JP | 2014094742 A | 5/2014 |

OTHER PUBLICATIONS

Machine translation of description portion of French publication 2584036, published Jan. 1987. (Year: 1987).*
International Search Report and Written Opinion in corresponding International Application No. PCT/EP2021/075332, dated Dec. 22, 2021 (11 pages).
Notification of Reasons for Refusal issued in corresponding JP Application No. 2023-517819, issued on Feb. 29, 2024 (14 pages).

* cited by examiner

[Fig 1]
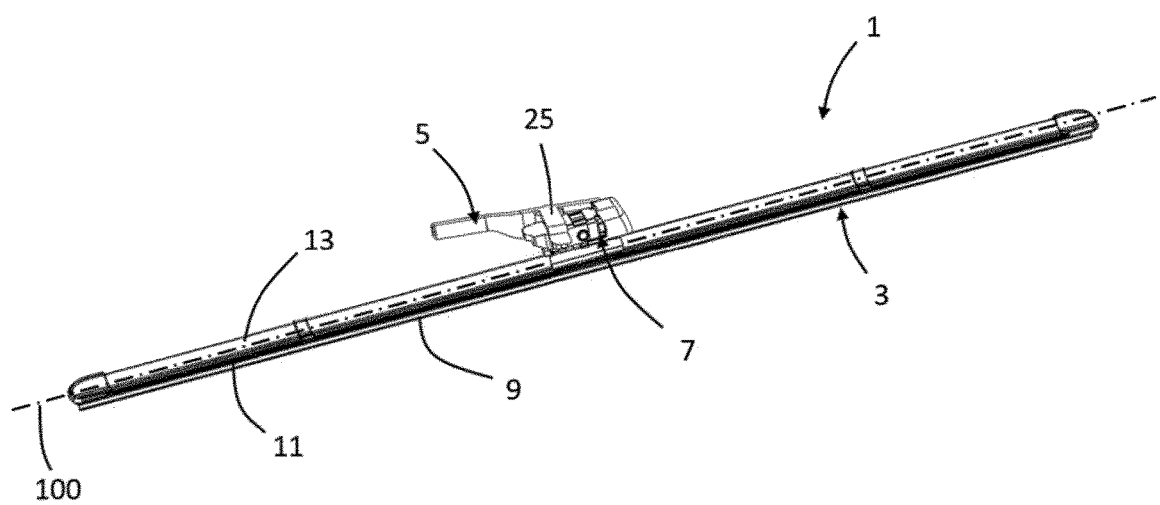
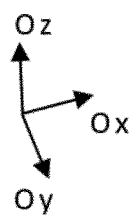

[Fig 2]
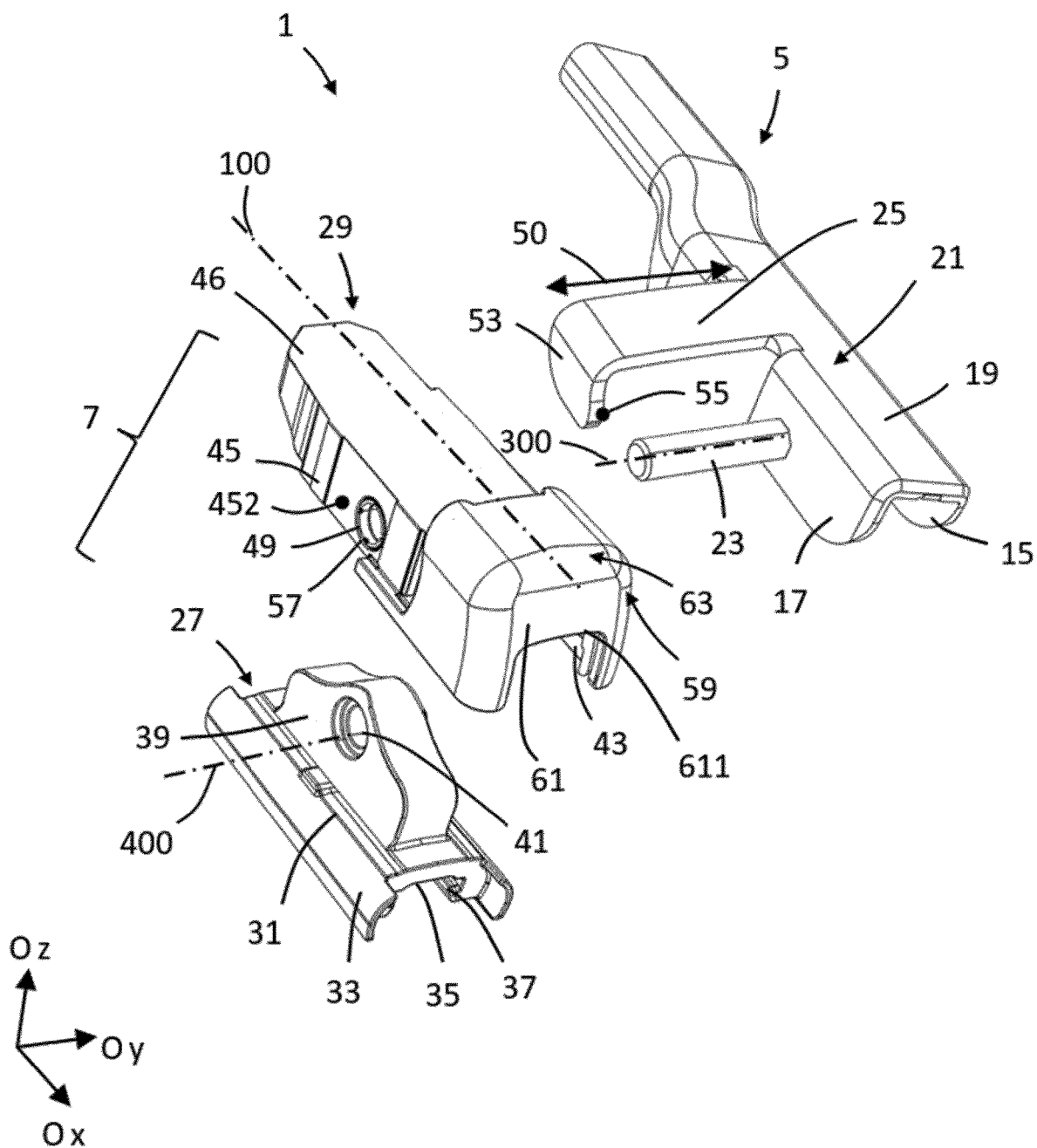

[Fig 3]
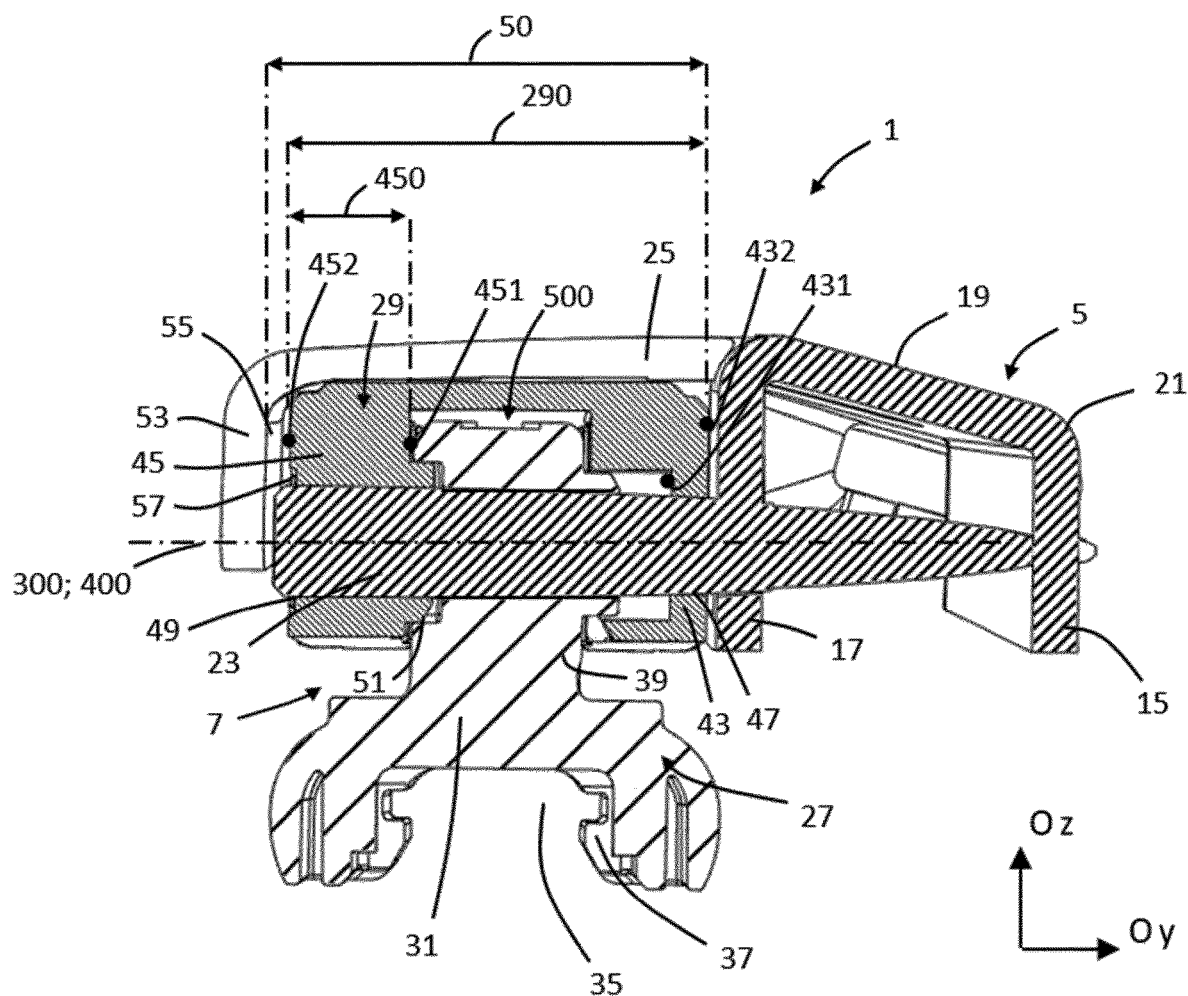

[Fig 4]
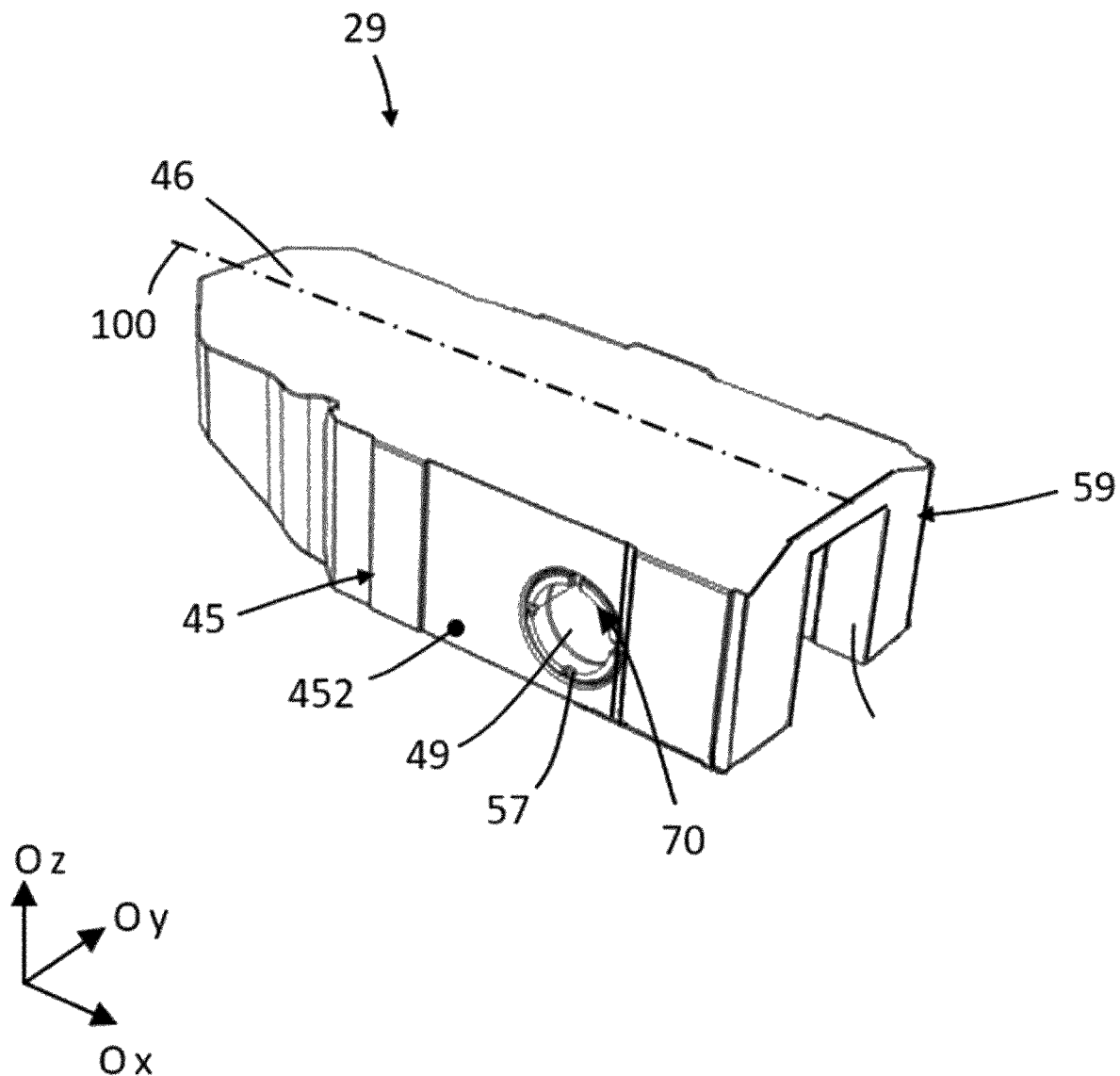

[Fig 5]
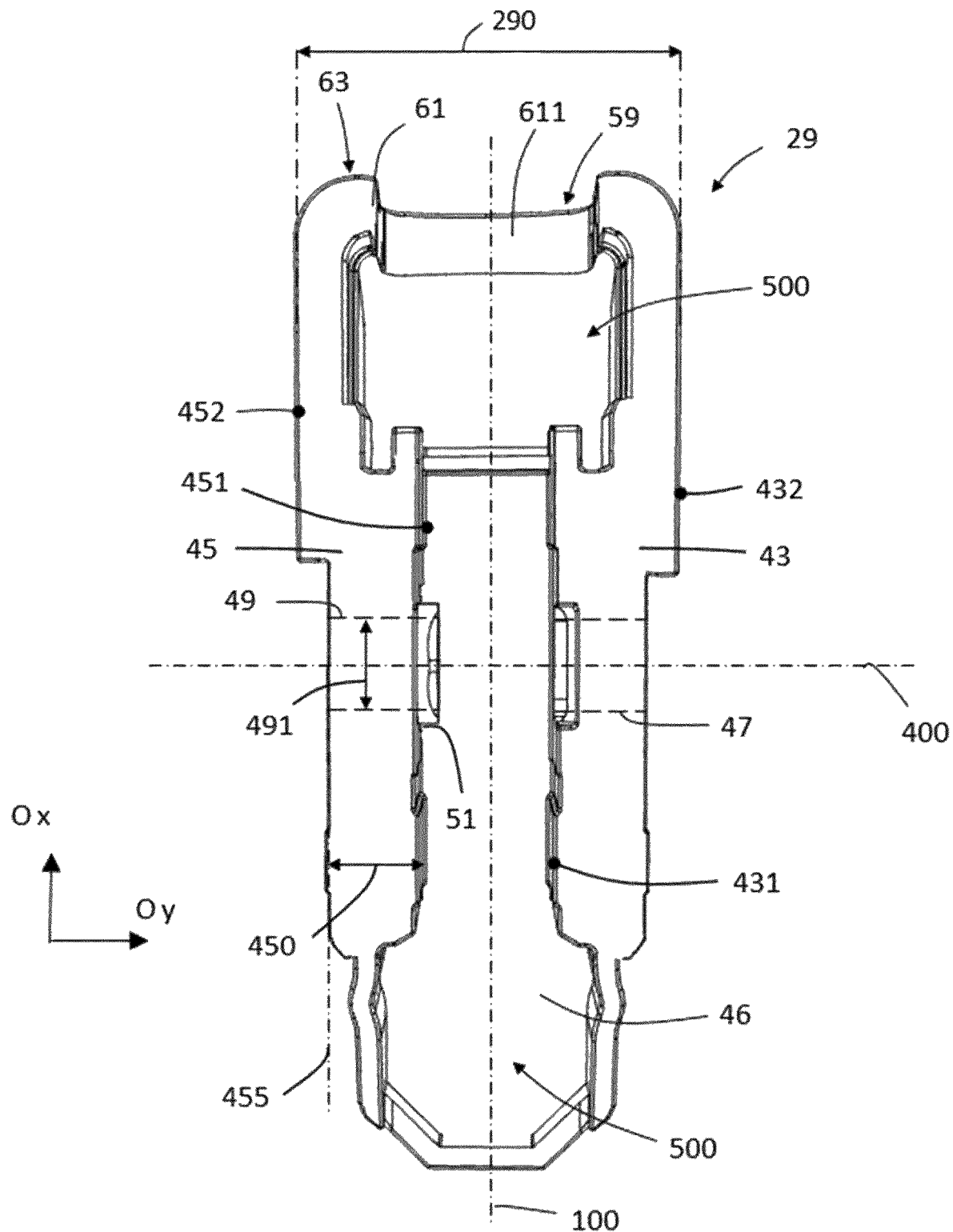

[Fig 6]
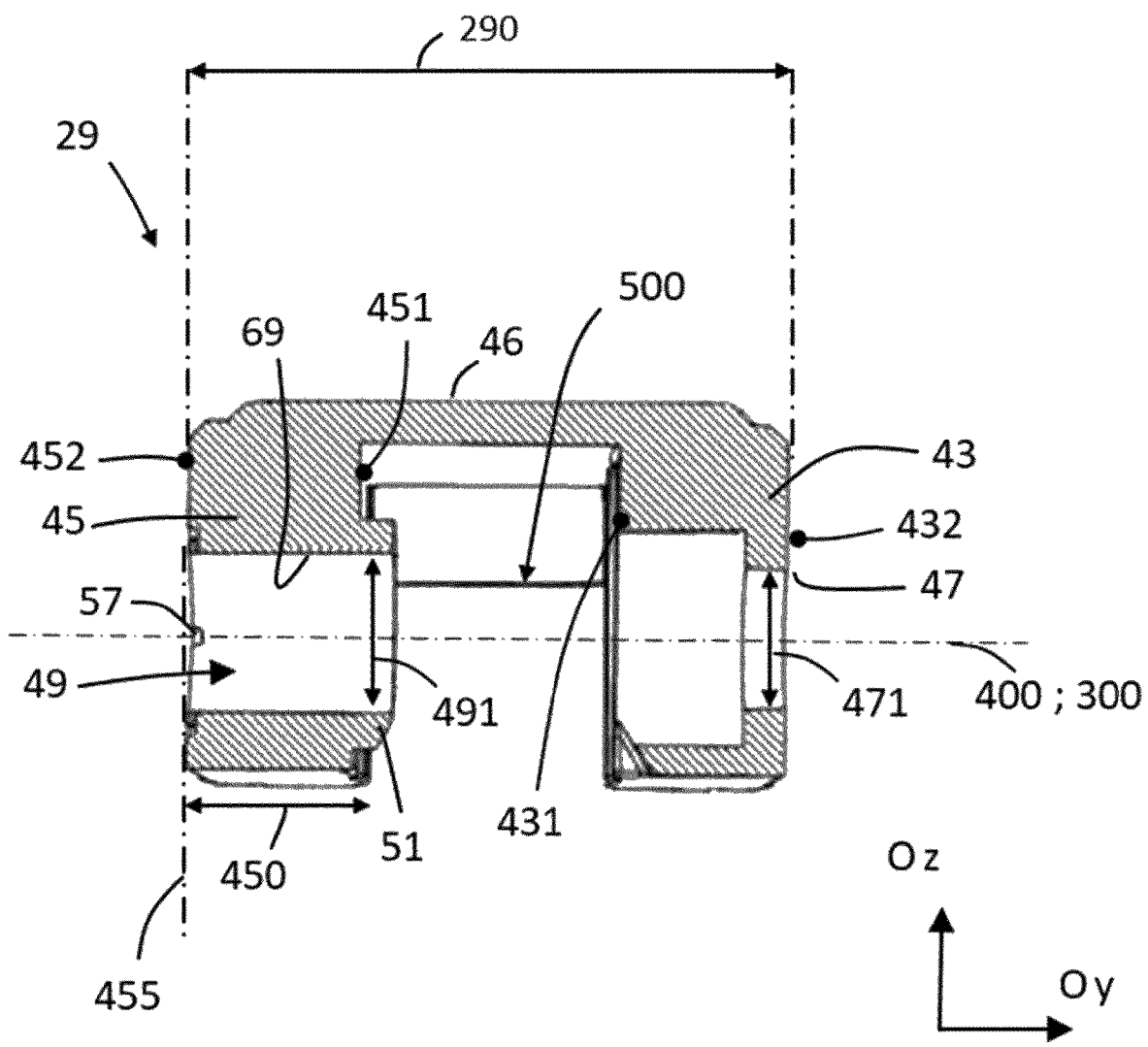

[Fig 7]
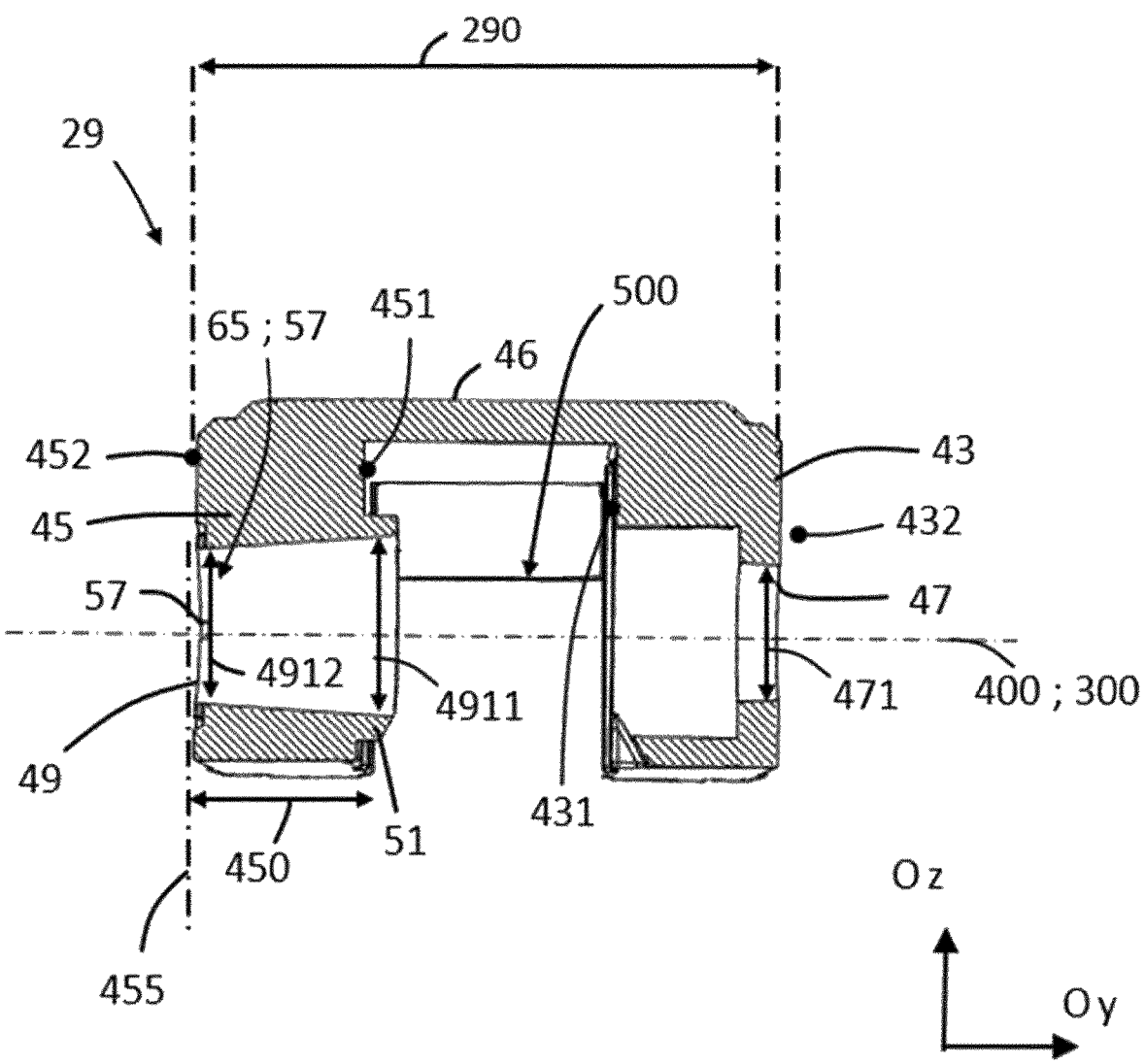

[Fig 8]
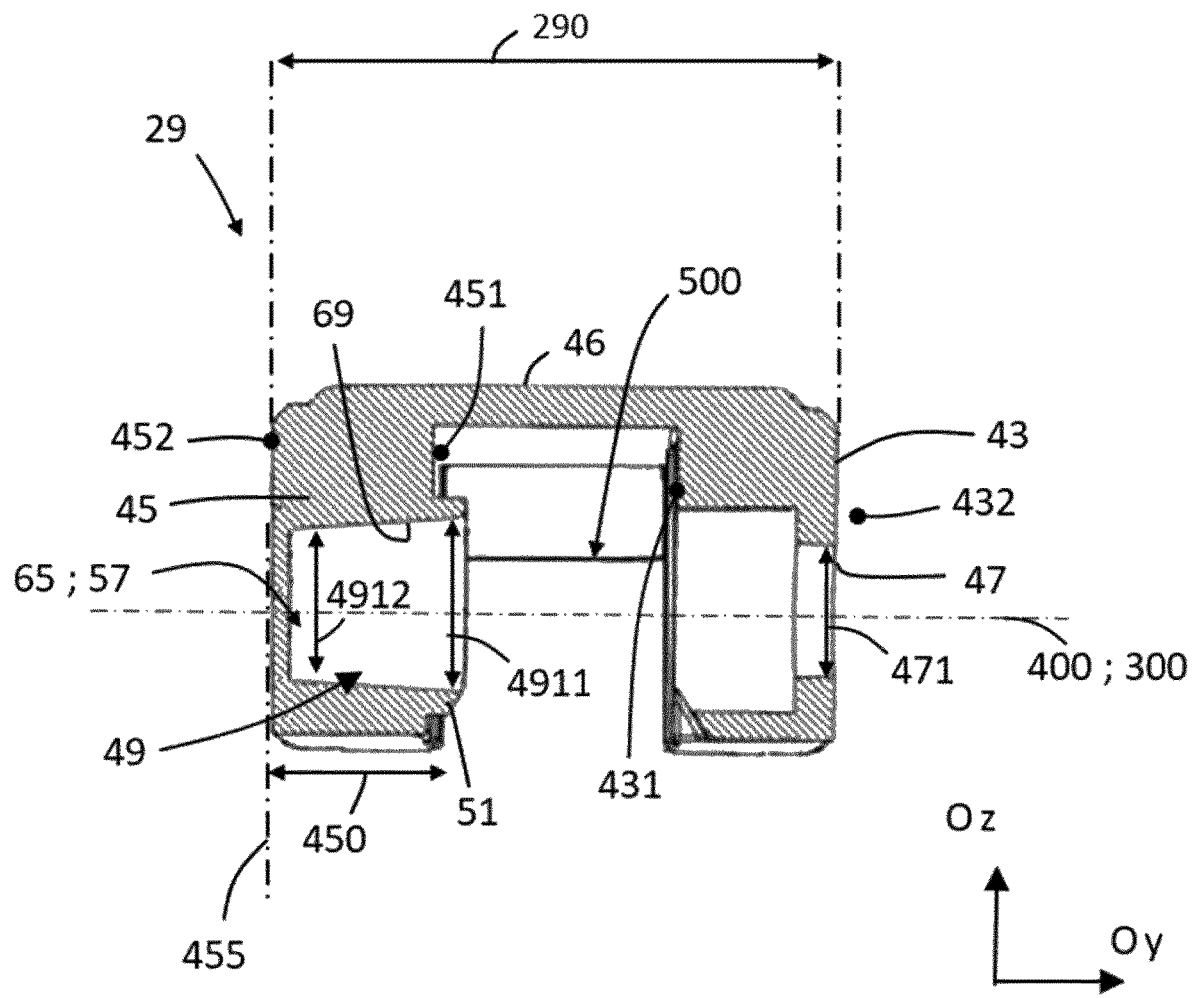

[Fig 9]
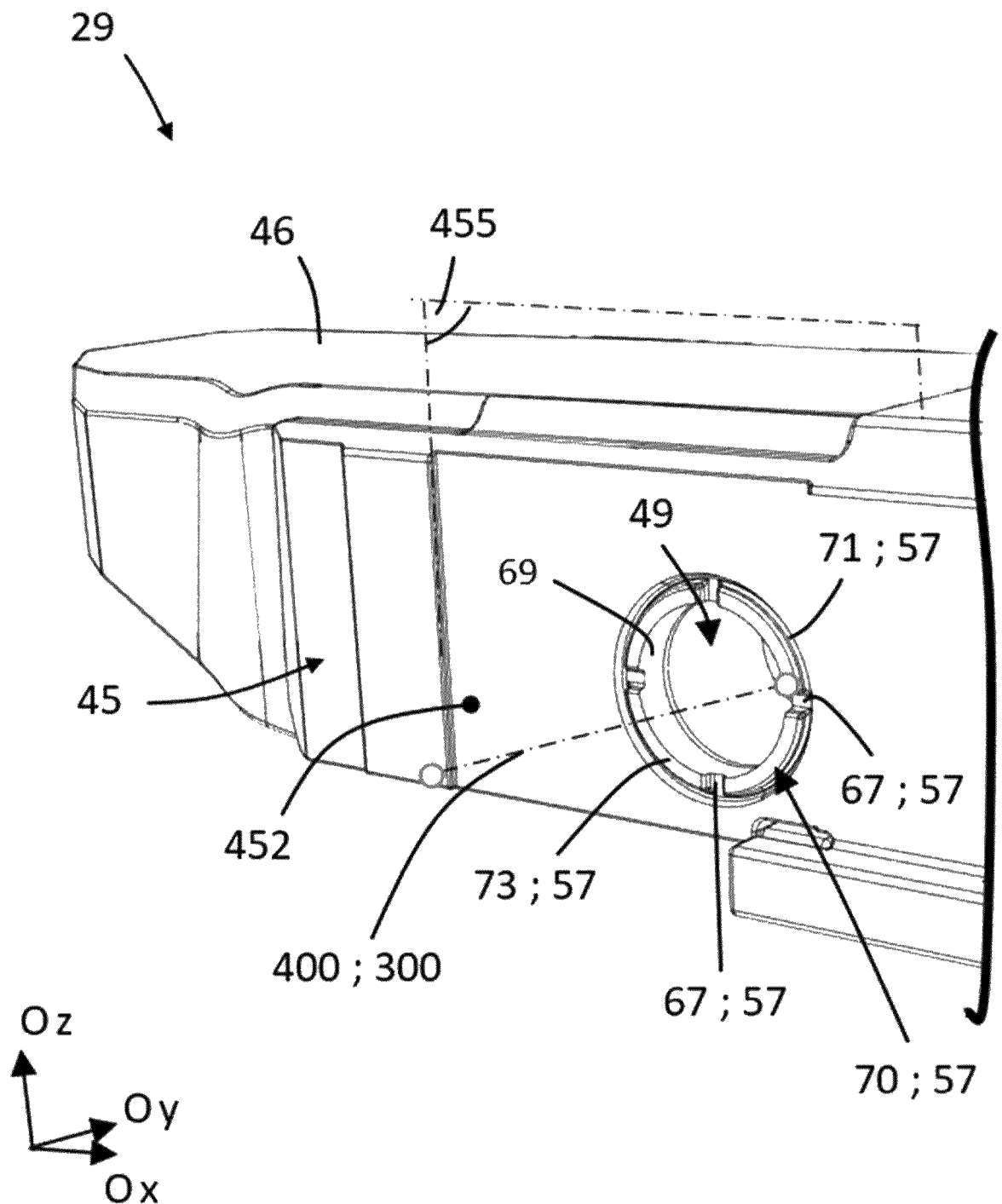

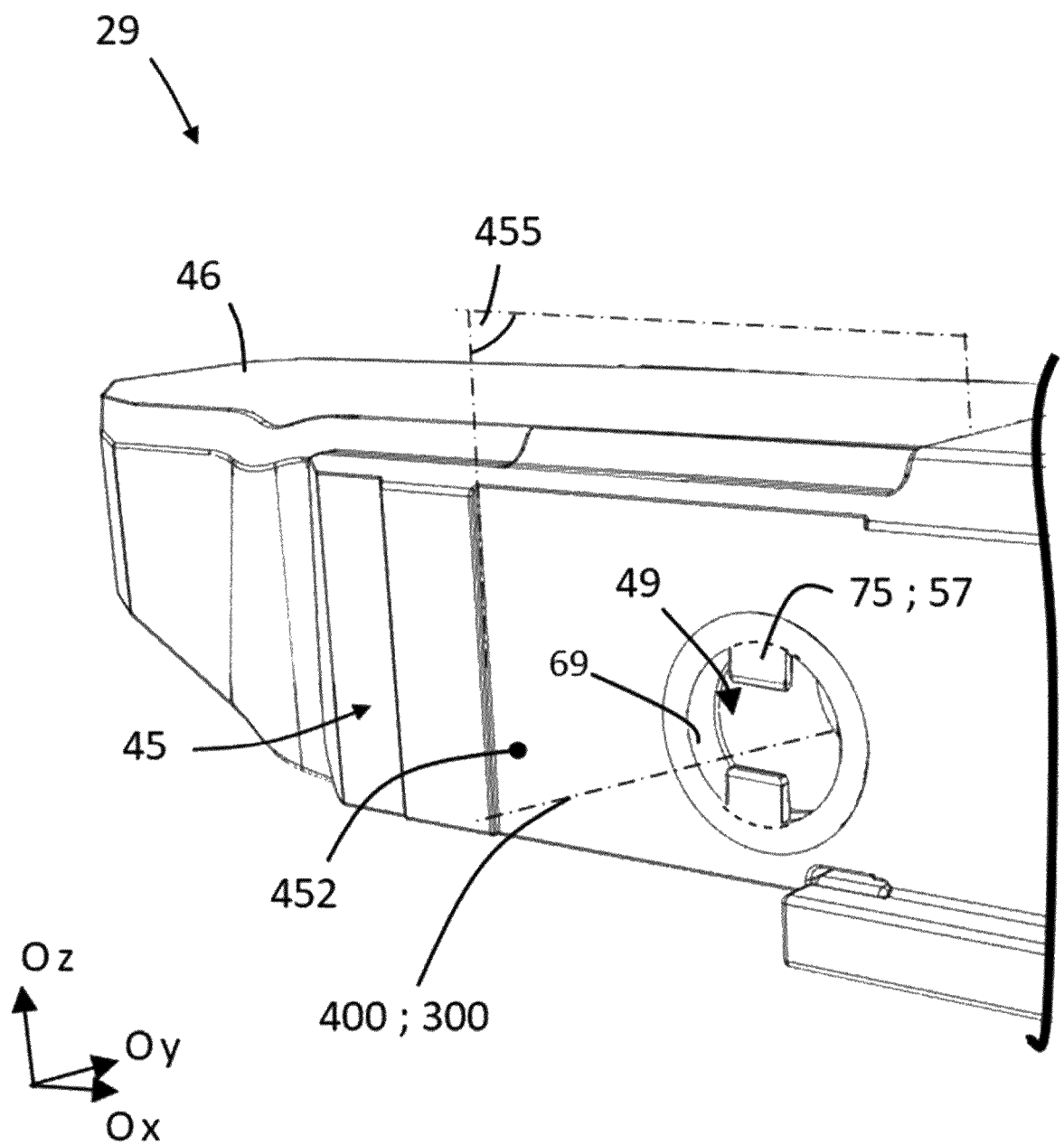
[Fig 10]

[Fig 11]
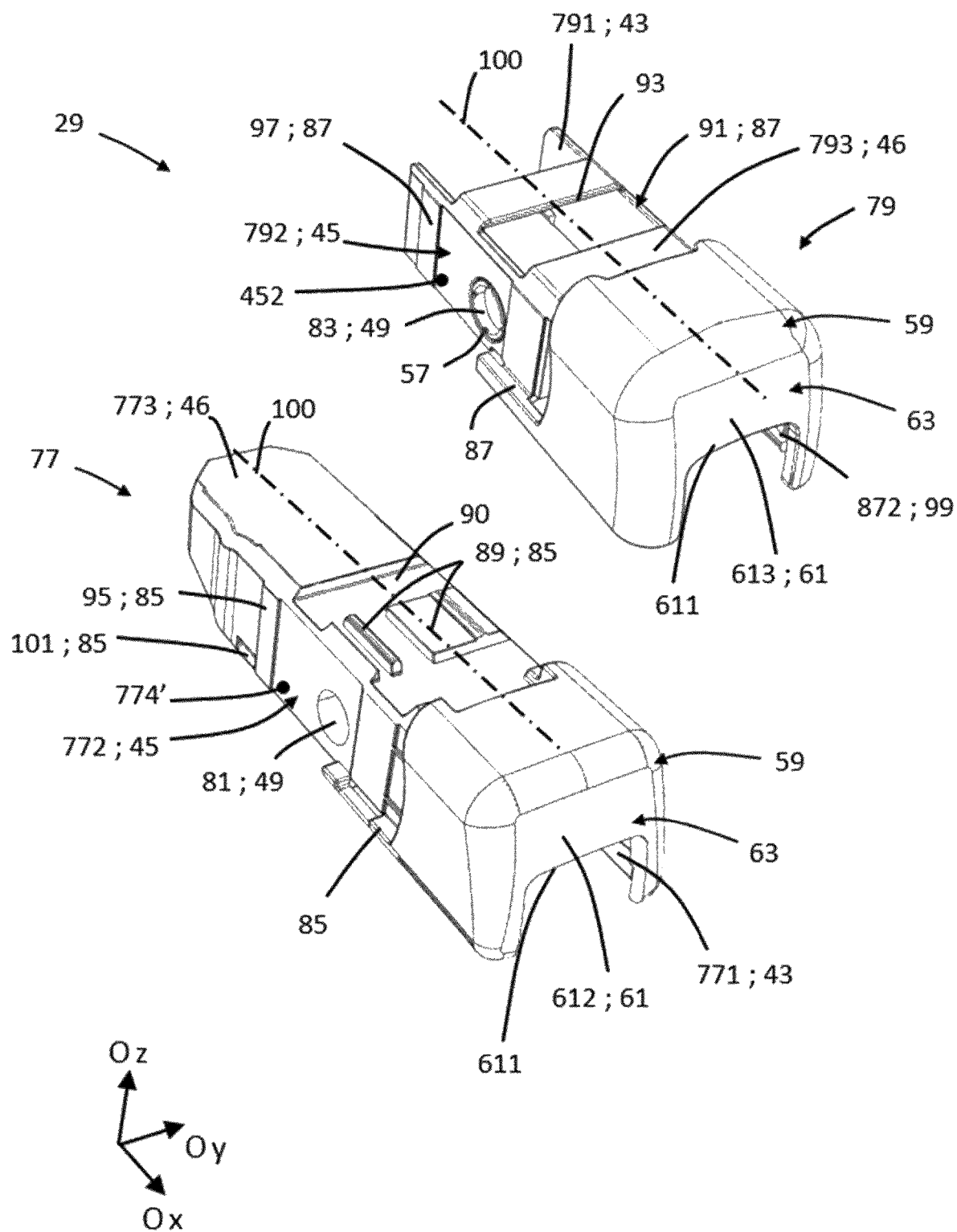

[Fig 12]
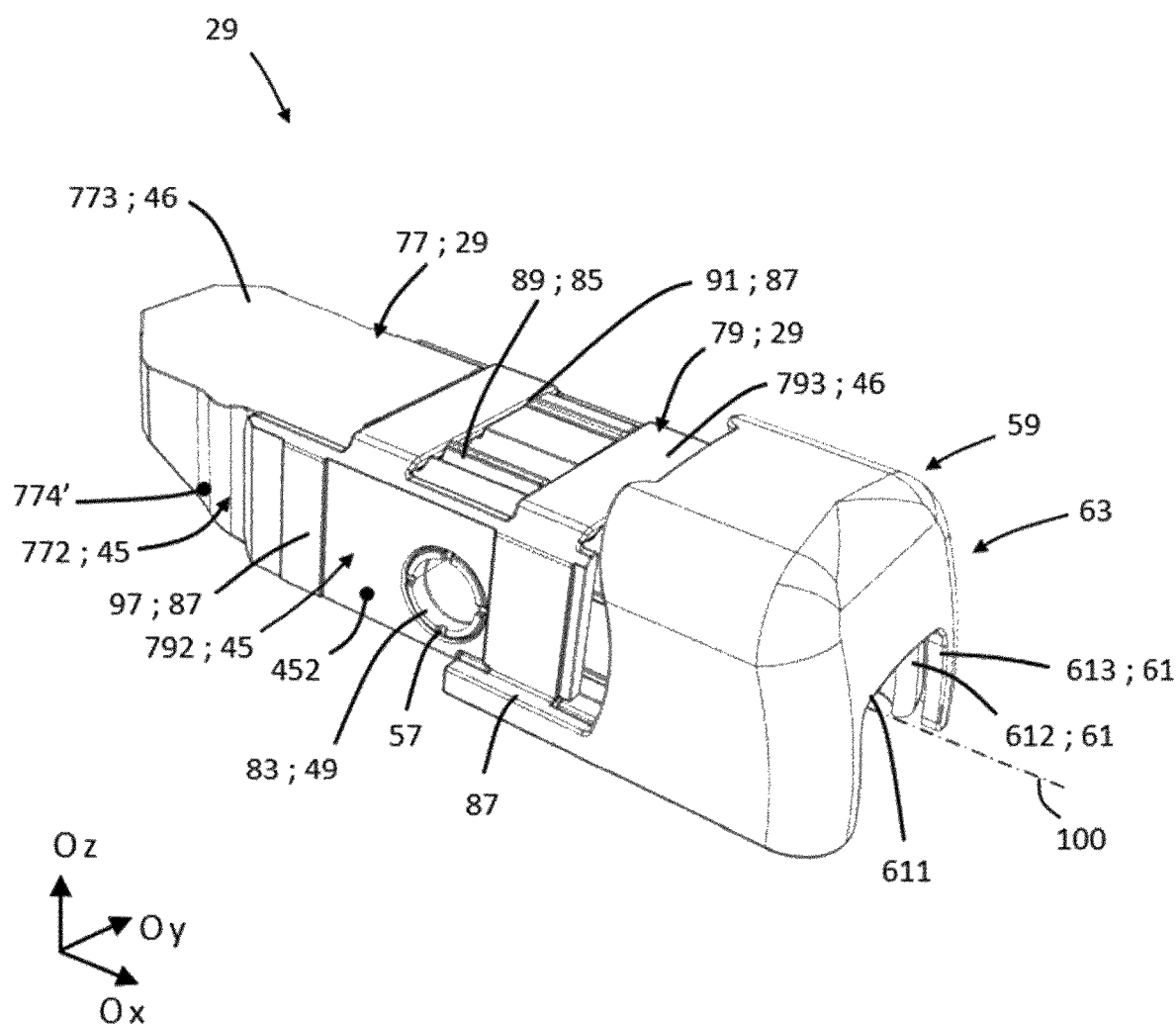

[Fig 13]
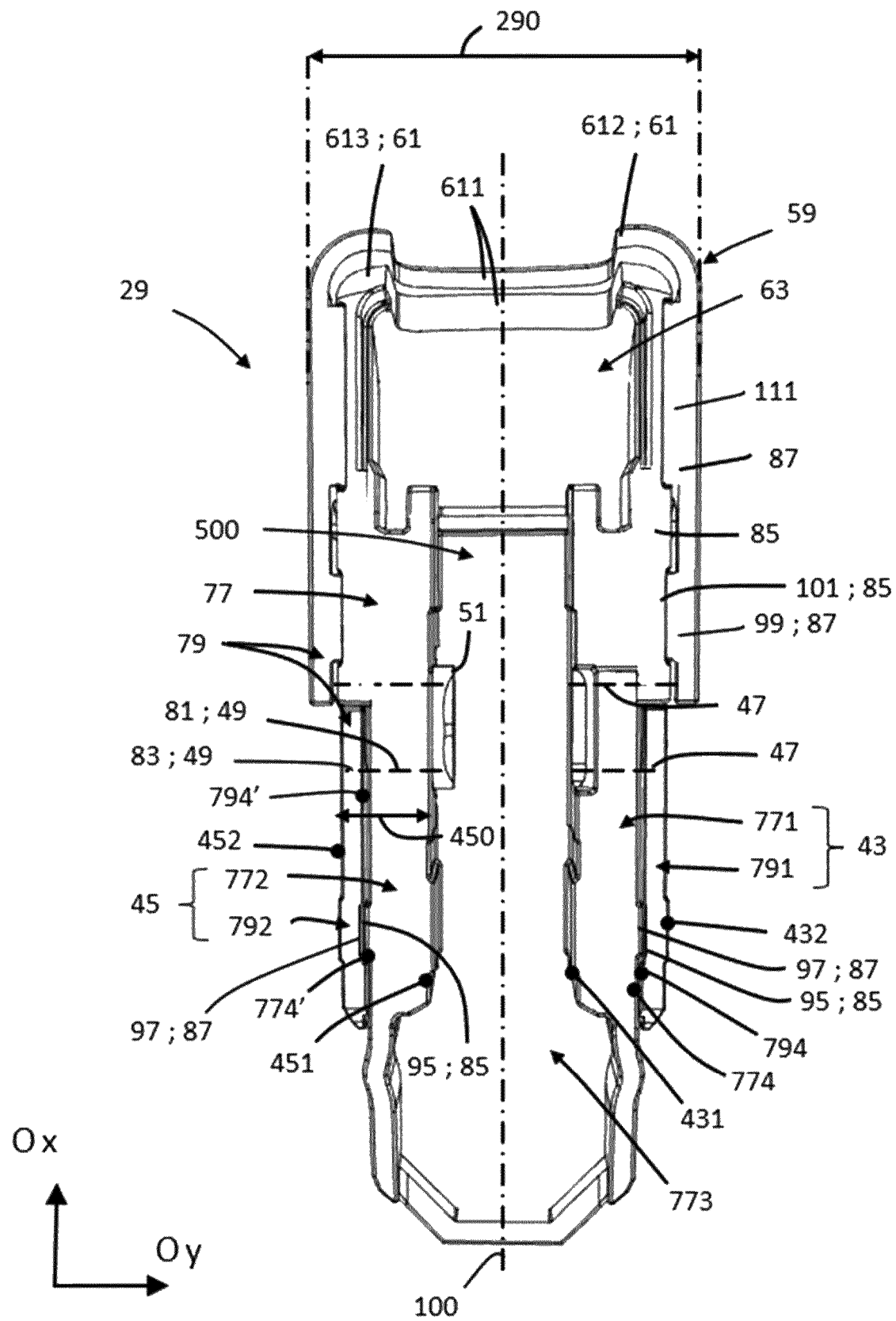

[Fig 14]
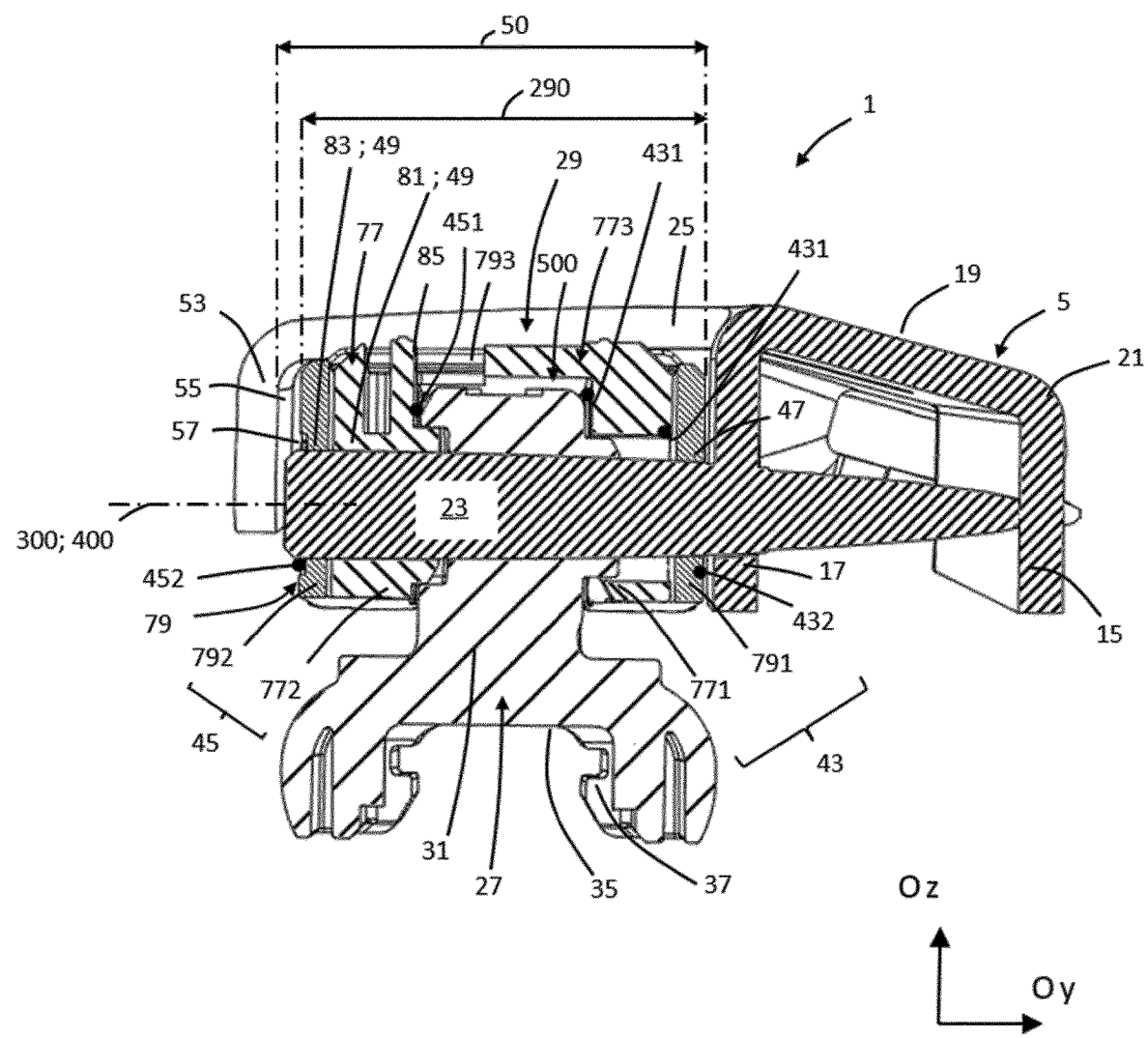

[Fig 15]
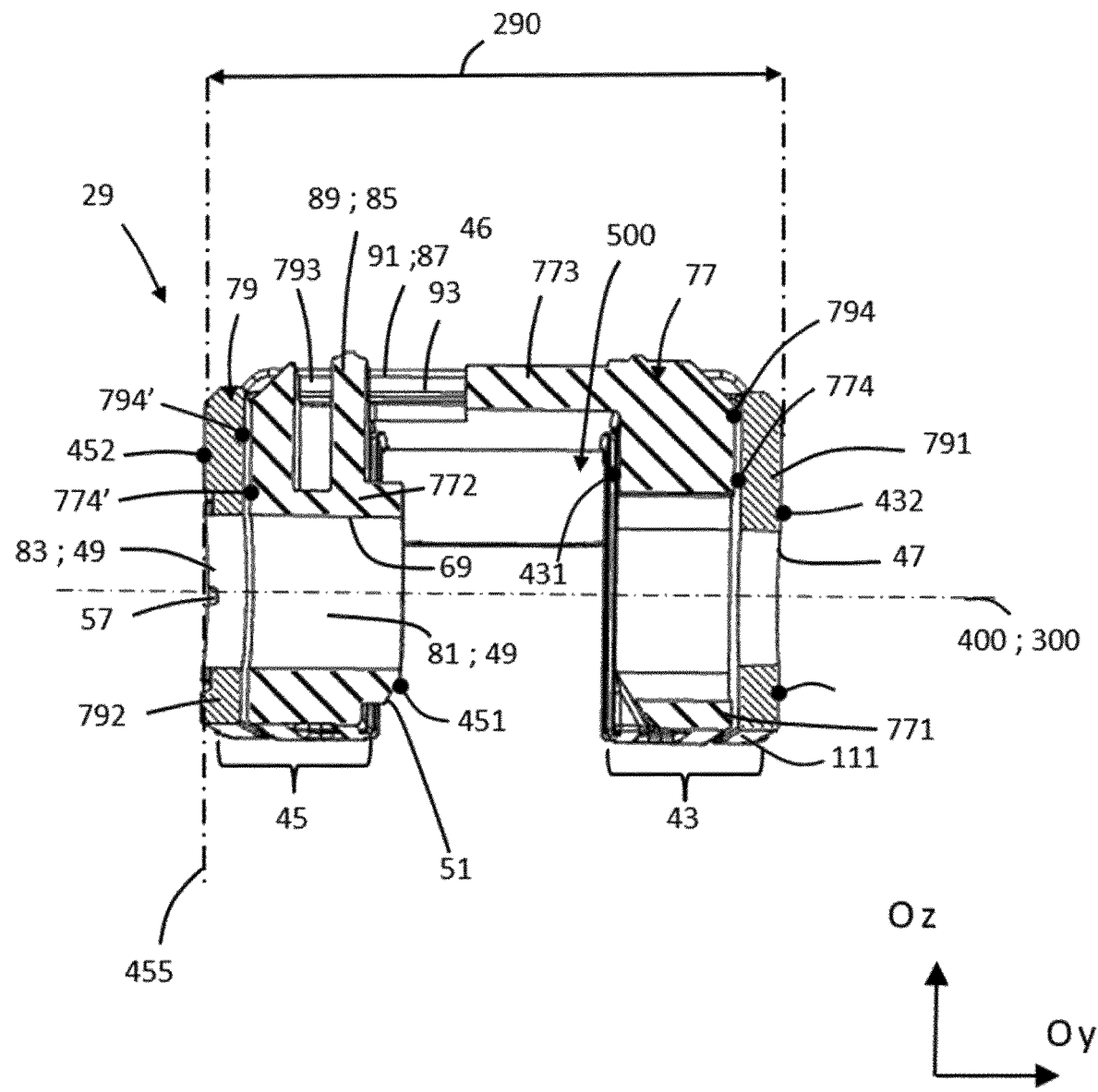

[Fig 16]
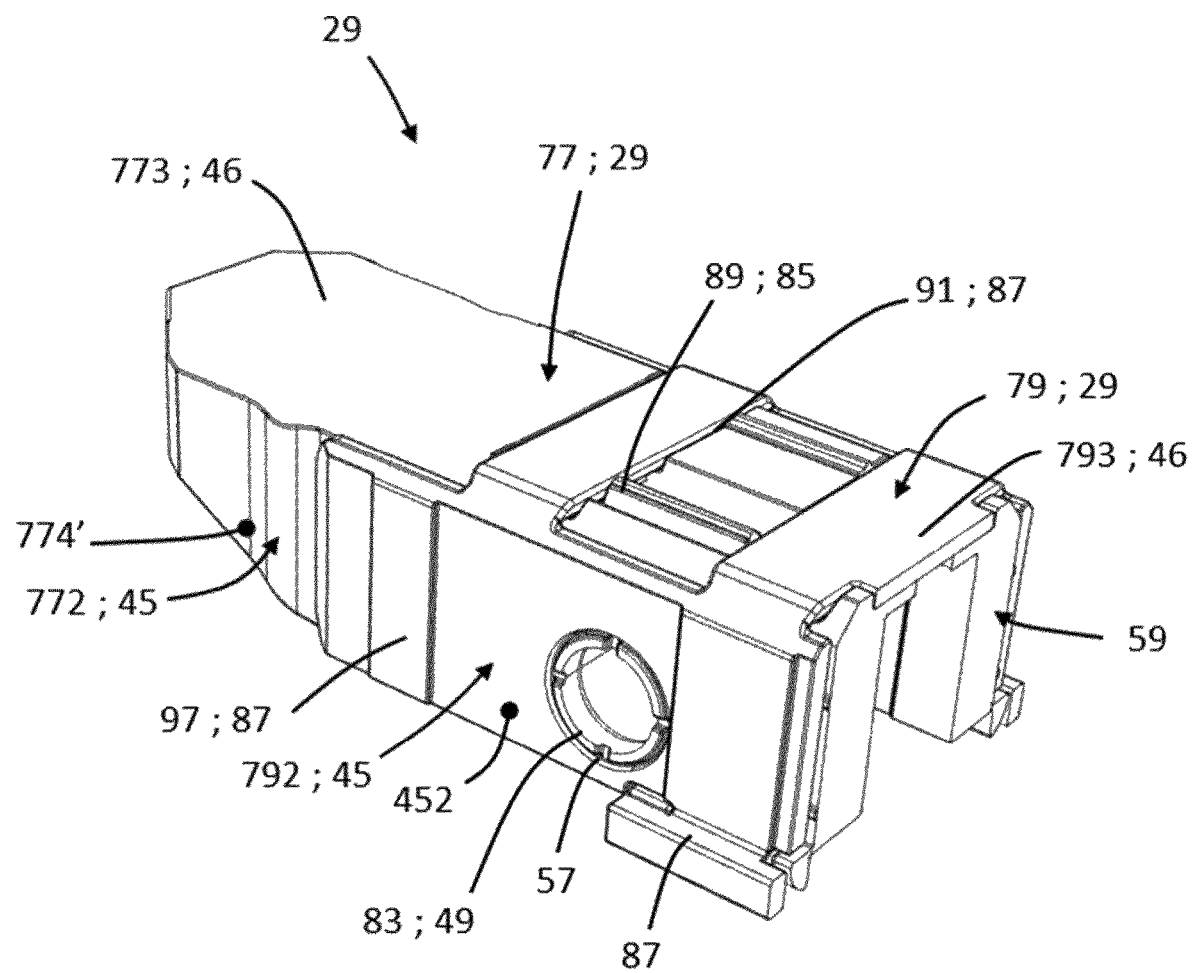
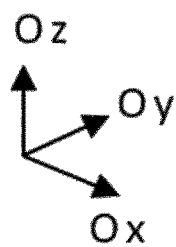

[Fig 17]
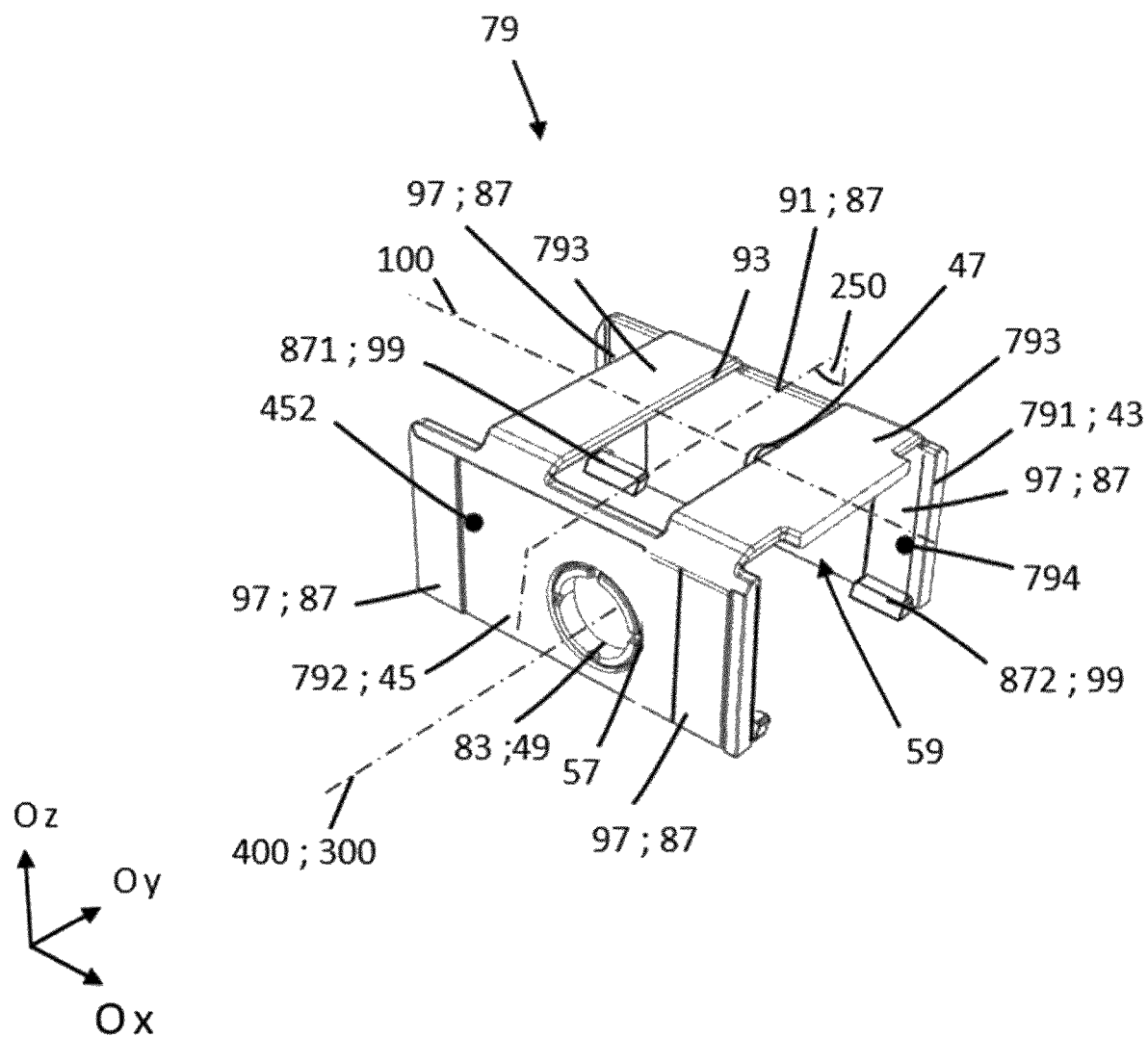

ADAPTER FOR A MOTOR VEHICLE WIPER SYSTEM

The present invention relates to the domain of wiper systems for motor vehicles and concerns more specifically wiper systems comprising a wiper blade, a drive arm for said blade, and a connection device intended to mechanically link the wiper blade to the drive arm.

Wiping systems for motor vehicles are designed to remove liquids and dirt, which can disrupt the driver's view of his surroundings, by wiping. These wiper systems usually comprise a drive arm performing an angular to-and-fro movement, and one or more elongated wiper blades fitted with rubbers made of an elastic material. By rubbing against a glazed surface, these rubbers sweep away the water or cleaning liquid and some of the dirt from the driver's field of vision.

Regardless of the layout of the wiper blade, the wiper blade is attached to the drive arm by a connection device. Connection devices comprising at least one connector and one adapter, in which the connector is rigidly connected to the wiper blade and the adapter is a component designed firstly to cooperate with the connector and secondly to engage with an end portion of the drive arm, are known. The connector and the adapter cooperate, notably by means of a pivot link, to attach the wiper blade to the drive arm and to form an articulated link between these two assemblies.

Vehicles can be fitted with several types of wiper systems, which differ from each other notably in the shape of the end portion of the drive arm intended to be rigidly connected to the adapter, and therefore in the shape of the corresponding adapter. In this context, in the after-sales market for windscreen wiper blades, it is known to sell a standard wiper blade that is fitted with an appropriate connector and intended to cooperate with several types of windscreen wiper arms.

These varieties of drive arms include in particular those referred to as "side lock". In such drive arms, the end portion has a substantially L-shaped lug and pin that extend transversely to a main direction of extension of the drive arm. The pin passes through the adapter and the connector and forms a common pivot axis for the drive arm and the wiper blade, and the lug secures the mechanical link between the drive arm and the wiper blade by locking at least the movement of the adapter relative to the drive arm in the transverse direction, i.e. along the length of the pin. One drawback of such wiper systems is the complexity of adjusting the dimensions of the various components, especially the lug of the drive arm and the adapter, so as to prevent the wiper blade from moving in the transverse direction.

In the aforementioned after-sales market, it is known to sell the standard wiper blade and related connector with a plurality of adapters respectively designed to cooperate with the standard connector and with one of the drive arms specifically. Such an offer may dissuade users because it involves purchasing adapters that the user does not need.

Equipment suppliers therefore offer standard wiper blades provided with a standard connector and a few adapters, and if possible a standard adapter, that fits a plurality of drive arm types, notably including side-lock arms.

The present invention addresses this matter and offers an alternative to conventional wiper systems for achieving a reliable, durable and inexpensive mechanical connection between a connector and an adapter for a wiper blade and a drive arm respectively, in particular for side-lock drive arms.

For this purpose, the invention proposes an adapter for a connection device designed to connect a wiper blade to a drive arm in a wiper system for a motor vehicle, comprising a first side wall and a second side wall spaced apart from each other and connected to each other by a top wall, the first side wall and the second side wall having respectively a first orifice and a second orifice that are designed to receive a pin projecting from the drive arm in a transverse direction.

The adapter is characterized in that the second side wall comprises at least one fastening means for fastening the pin in the second orifice designed to rigidly connect the adapter to the drive arm at least in the transverse direction.

The first orifice, formed in the first side wall, performs at least the function of guiding the pin of the drive arm through the adapter, and in particular through the internal volume of the adapter.

The fastening means carried on the second side wall ensure the transverse position of the pin in the second orifice and thus ensure that said adapter is locked in relation to the drive arm at least in the transverse direction, i.e. in both senses of said transverse direction, so as to ensure the transverse fastening of the adapter with respect to the drive arm.

In other words, the second side wall has fastening means arranged about the edge of the second orifice or inside the second orifice designed to block the transverse movement of the pin rigidly connected to the drive arm in the second orifice formed in the adapter.

This enables the adapter, and by extension the connection device of the wiper system, to be applied to a wide variety of drive arms, regardless of the size of the fastening means projecting from the drive arm and associated with the pin, given that the longitudinal dimension of these fastening means may vary from one drive arm to another.

Advantageously, the second orifice can also be designed to keep the adapter rigidly connected to the drive arm in the longitudinal direction and/or in a vertical direction orthogonal to the transverse direction and the longitudinal direction.

According to a feature of the present invention, the at least one fastening means is elastically deformable. "Elastically deformable" means that the fastening means is designed to deform as the pin passes through the second orifice and to generate an elastic return force tending to return the fastening means to the original position, this elastic return force enabling the position of the adapter to be set in relation to the pin.

Notably, the adapter can be made at least partially of a polymer material with more or less elastic properties, for example a thermoplastic polymer, such as polyoxymethylene or filled polybutylene terephthalate (PBT).

According to an optional feature of the invention, the second orifice is a through-hole extending between an inner face of the second side wall, oriented towards an internal volume of the adapter, and an outer face, opposite the inner face, of the second side wall.

According to an optional feature of the invention, the second orifice is a blind hole extending from an inner face, oriented towards an internal volume of the adapter, of the second side wall and having a bottom wall arranged at a non-zero distance from an outer face, opposite the inner face, of the second side wall.

According to an optional feature of the invention, the at least one fastening means may consist of a narrowing portion of the second orifice, the second orifice having a substantially frustoconical shape and being defined by at least a first principal dimension of the second orifice and a second principal dimension of the narrowing portion, measured respectively at an inner face and an outer face of the second side wall, the first principal dimension being larger than the second principal dimension.

In particular, the second orifice can have a circular section, in which case the first principal dimension and the second principal dimension are the diameters of the frustoconical shape of the second orifice through the second side wall.

Additionally, the first orifice, which is for example cylindrical, may be characterised by a primary principal dimension that is substantially equal to the first principal dimension of the second orifice. Where the first orifice is of circular section, the primary principal dimension is a diameter. Where the first orifice is of polygonal section, the primary principal dimension is the longest diagonal of the section.

According to an optional feature of the invention, the at least one fastening means can include at least one flexible tab extending across the second orifice and forming a radial projection from the edge delimiting the second orifice. "Tab" means a substantially elongate structure, for example a parallelepipedic structure, having one free end that may converge towards an axis of the second orifice, for example the rotation axis of a connector associated with the adapter to form the connection device, on which the second orifice may be centred. Notably, such tabs are designed to be in at least partial contact with the pin when the pin is inserted into the second orifice.

According to an optional feature of the invention, the at least one fastening means is a resilient clamping ring made in the material of the second side wall, said resilient clamping ring being at least partially incorporated into an outer face of the second side wall.

According to an optional feature of the invention, the resilient clamping ring forming the fastening means is delimited radially, about the edge delimiting the second orifice, by a groove that defines at least one slat arranged between this groove and the edge delimiting the second orifice. At least one notch may be arranged radially [ . . . ] a slat, so that each slat is separated from an adjacent slat by a notch, each notch extending radially from the edge delimiting the second orifice to the groove. "Notch" means a hollow structure extending inwards from an outer plane essentially containing the outer face of the second side wall.

According to one feature of the invention, the second side wall may comprise a plurality of fastening means. By way of example, there may be a second orifice designed such that the envelope delimiting said orifice has a frustoconical shape and such that a first fastening means is thus formed by a narrowing portion as mentioned above, and there may also be a second fastening means formed by a tab projecting radially into the envelope delimiting the second orifice and/or a third fastening means formed in an outer face of the second side wall, on the edge of the second orifice opening out into this second side wall, for example in the form of a notch or notches.

According to a first embodiment of the wiper system, the adapter may be a one-piece assembly. "One-piece" means that the adapter comprises a single part and that the side walls or the top wall cannot be separated from each other without damaging or at least partially destroying the adapter.

According to a second embodiment, the adapter comprises at least one primary element and one secondary element, the secondary element being attached to the primary element and engaged therewith:
- the primary element having a first primary side wall and a second primary side wall that are spaced apart from each other and joined together by a primary top wall,
- the secondary element having a first secondary side wall and a second secondary side wall that are spaced apart from each other and joined together by a secondary top wall,
- the first side wall of the adapter comprising at least the first primary side wall and the first secondary side wall and the second side wall of the adapter comprising at least the second primary side wall and the second secondary side wall.

According to a feature of such an embodiment, the secondary element of the adapter includes the at least one fastening means and at least partially surrounds the primary element.

In other words, the secondary element of the adapter comprises the outer face of the second side wall and the outer face of the first side wall, while the primary element comprises the inner face of the same side walls.

Such an embodiment notably enables the primary element and secondary element to be made of different materials, for example so that a material with elastic properties can be used for the element comprising the fastening means, in this case the second element.

According to an optional feature of the present embodiment, the primary element comprises at least one locking member and the secondary element comprises at least one complementary locking means that is designed to cooperate with the at least one locking member, the locking member and the complementary locking means being at least designed to lock the secondary element in the longitudinal direction. For example, at least the locking member and/or the complementary locking means may consist of ribs and slots of complementary shapes and sizes.

According to an optional feature of the present embodiment, the complementary locking means may extend symmetrically on both sides of a median plane, orthogonal to the longitudinal axis, of the secondary element.

According to an optional feature of the present embodiment, the secondary element may comprise a plurality of complementary locking means, at least a first complementary locking means and a second complementary locking means being arranged symmetrically in relation to one another about a median plane, orthogonal to the longitudinal axis, of the secondary element.

Such arrangements of the complementary locking means makes the secondary element of the adapter reversible, enabling said element to be used in wiper systems in which the drive arm extends opposite to the position set out above with respect to the adapter, i.e. a position in which the second primary side wall of the primary element faces the flank of the drive arm bearing the lug. "Reversible" means that the secondary element can be separated from the primary element, rotated 180° about the vertical direction and then reassembled on the primary element.

According to an optional feature of the invention, regardless of the implemented embodiment, the adapter may comprise at least one end edge designed to at least partially cover a longitudinal end of the connection device along the longitudinal axis notably such as to prevent particles and debris from accumulating in the connection device, for example in the joint of a connector of the connection device on the wiper blade.

Notably, where the adapter is made according to the second embodiment, the primary element and/or the secondary element may form such an end edge.

Advantageously, such an end edge may comprise at least one through-notch for the wiper blade, for example for a deflector of the wiper blade.

The invention also relates to a connection device designed to connect a wiper blade to a drive arm in a wiper system for a motor vehicle, the connection device comprising at least one connector designed to be rigidly connected to the wiper blade and including at least one transverse hole designed to receive the pin, and an adapter as mentioned above that is mounted pivotingly about a rotation axis on the connector to link the connector to the drive arm.

The invention further relates to a motor vehicle wiper system comprising a wiper blade, a drive arm and such a connection device, the drive arm comprising at least one pin and one lug, both projecting in a transverse direction from an end portion of the drive arm.

In accordance with the foregoing, the adapter, and by extension the connection device of the wiper system, can be applied to a wide variety of drive arms, which differ from one another notably in the transverse dimension of the lug, and which therefore do not all enable a given adapter of standard size to be locked transversely by stopping a side face of the adapter against an inner surface of the lug. The present invention is therefore particularly designed to ensure such transverse locking by cooperation between the pin and the second side wall and/or the second orifice of the adapter, i.e. regardless of the size of the lug, thereby providing an alternative for improving the reliability of the rigid connection of the adapter to the drive arm that can be adapted to different side-lock drive arms of varying dimensions.

Within the adapter, the first orifice and/or the second orifice may be at least partially opposite the transverse hole of the connector.

The connector may notably have a base rigidly connected to the blade and a low wall projecting from the base, opposite the blade. And the adapter and the connector may notably be arranged in relation to one another such that the side walls of the adapter define a seat designed to receive the low wall of the connector, the side walls of the adapter being arranged on both sides of the wall. Means for pivoting the adapter relative to the connector are carried by the low wall and the side walls respectively.

According to one feature of the invention, the end portion of the drive arm has at least a first flank and a second flank, at least the second flank carrying the pin and the second flank bearing at least partially against an outer face of the first wall of the adapter.

In other words, according to the present invention, the side wall of the adapter, in this case the second side wall, furthest away from the drive arm, and notably from the second flank, comprises the fastening means designed to lock the adapter transversely.

Conversely, in the first side wall, the first orifice may be of any shape, for example substantially cylindrical with a circular or polygonal section, and may or may not be at least partially in contact with the pin.

According to a feature of the invention, the lug comprises at least one end stop flange for the adapter arranged opposite the second side wall of the adapter.

Specifically, the lug is defined by a transverse dimension, measured between the second flank and an inner surface of the end flange, the transverse dimension being strictly greater than a corresponding transverse dimension of the adapter measured between the outer face of the first side wall and the outer face of the second side wall, the inner surface of the end flange being arranged at a non-zero distance from the outer face of the second side wall of the adapter.

The invention also relates to a motor vehicle comprising a wiper system as described above.

Other features, details and advantages are set out more clearly in the detailed description given below by way of example and in relation to the different example embodiments illustrated in the following figures:

FIG. 1 is a general schematic view of a wiper system according to the invention comprising a drive arm and more specifically an end portion of this arm, as well as a connection device and a wiper blade, FIG. 2 is an exploded view of the end portion of the drive arm and the connection device of the wiper system according to the invention, showing an adapter, in this case according to a first embodiment, and a connector, FIG. 3 is a cross section of the drive arm and the connection device comprising an adapter according to the first embodiment, FIG. 4 is a perspective view of an alternative first embodiment of the adapter, FIG. 5 is a simplified bottom view of the adapter of the connection device as shown in FIG. 2 or 3, FIG. 6 is a cross section of an adapter as shown in FIGS. 2 to 5, showing first example fastening means, FIG. 7 is a cross section of the adapter shown in FIGS. 2 to 6 comprising second example fastening means, FIG. 8 is a cross-section view similar to FIG. 7 showing a variant of the second example fastening means, FIG. 9 is a perspective view showing the adapter in FIGS. 2 to 5 in greater detail, with the first example fastening means, FIG. 10 is a perspective view similar to FIG. 9 showing third example fastening means, FIG. 11 is an exploded perspective view of the adaptor according to a second embodiment, the adaptor comprising a primary element and a secondary element, this adaptor comprising first example fastening means, FIG. 12 is a perspective view of the adapter according to the second embodiment when assembled, FIG. 13 is a simplified bottom view of the adapter of the device according to the second embodiment, FIG. 14 is a cross section of a drive arm and a connection device comprising the adapter according to the second embodiment, FIG. 15 is a cross section of the adapter according to the second embodiment, FIG. 16 is a perspective view of an alternative of the adapter according to the second embodiment when assembled, FIG. 17 is a perspective view of a specific example embodiment of the secondary element of an adapter as shown in FIG. 16.

It should first be noted that the figures show the invention in detail to enable the invention to be carried out, and these figures may naturally be used to better define the invention where appropriate.

The features, variants and different embodiments of the invention may be associated with one another in different combinations, where not incompatible or mutually exclusive. In particular, it may be possible to conceive of variants of the invention that comprise only a selection of features described below in isolation from the other features described, if this selection of features is sufficient to confer a technical advantage or to differentiate the invention from the prior art.

As illustrated in FIG. 1, the invention relates to a motor vehicle wiper system 1 comprising a wiper blade 3, a drive arm 5 and a connection device 7.

The wiper blade 3 is articulated and designed to move against a glazed surface of the motor vehicle, for example a windscreen. The wiper blade 3 extends mainly in a longitudinal direction Ox and comprises at least one flexible rubber 9, for example made of an elastomer material, designed to be in contact with the glazed surface of the motor vehicle, and a stiffening assembly 11 that cooperates with the rubber and may consist, by way of a non-exhaustive example, of one or more metallic splines. Additionally, the wiper blade 3 may comprise at least one aerodynamic deflector 13.

The connection device 7 is arranged between the wiper blade and the drive arm, in this case in a central area of the wiper blade 3, so as to link the wiper blade pivotingly to the drive arm 5, as detailed below with reference to FIGS. 2 and 3.

The drive arm 5 extends substantially in the aforementioned longitudinal direction Ox and comprises a first end, not shown here, linked to a drive mechanism and an end portion 21 opposite the first end that cooperates with the connection device 7. This end portion 21 has an inverted "U" structure, with a first flank 15 and a second flank 17 forming branches of the "U" and an upper flank 19, connecting the first flank 15 and the second flank 17 together, forming the base. In particular, the first flank 15 and the second flank 17 extend at least partially parallel to each other.

The end portion 21 of the drive arm 5 comprises at least one pin 23 and one lug 25, both of which project in a transverse direction Oy, orthogonal to the longitudinal direction Ox, from said end portion 21. Such a drive arm 5 is notably known as a "side-lock" drive arm, the pin 23 being designed to provide the rotary mechanical link between the connection device 7 and the drive arm 5 about a pivot axis 300 on which the pin 23 is centred.

The connection device 7 comprises at least one connector 27 and one adapter 29. The connector 27 is designed to be rigidly connected to the wiper blade 3. This connector provides a full mechanical link, i.e. rigid in rotation and in translation, with the wiper blade 3, so that once the connector is mounted on said wiper blade, the connector has no degree of freedom in relation to the blade.

The connector 27 comprises a base 31 that extends principally in the direction of extension of the wiper blade 3, in this case the longitudinal direction Ox, and that comprises a zone 33 for rigidly attaching the connector 27 to the wiper blade 3, for example in the form of one or more longitudinal grooves 35 formed in the lower portion of the base 31 to help define at least one claw 37 designed to engage the wiper blade 3 and, for example, the stiffening splines where said splines project laterally from the rubber. The base 31 is topped by at least one substantially vertical low wall 39 made from the same material as the base 31 and pierced by a transverse through-hole 41 of circular section that is centred on a rotation axis 400 that, once the blade and the related connector 27 are mounted on the arm, coincides with the pivot axis 300 of the pin 23 described above.

The adapter 29 is mounted pivotingly about the rotation axis 400 on the connector 27 and links the connector 27 to the drive arm 5. The adapter 29 has an overall parallelepipedic structure that may, by way of non-exhaustive example, be substantially elongate in the longitudinal direction Ox defined by the wiper blade 3. The adapter 29 comprises a first side wall 43 and a second side wall 45 spaced apart from each other. These walls are connected to each other by a top wall 46 which extends along a longitudinal axis 100 substantially parallel to the longitudinal direction Ox. In particular, the first side wall 43 and the second side wall 45 may extend parallel to each other. The adapter therefore contains a hollow space that forms a receiving seat for the low wall of the connector.

By convention, throughout this document, the term "longitudinal" refers to the main orientation of the wiper blade 3 or the top wall 46 of the adapter 29, the term "transverse" refers to a direction substantially perpendicular to the longitudinal direction defined by the main direction of extension of the pin 23 of the drive arm 5, and the term "vertical" refers to the direction perpendicular to both the longitudinal direction and the transverse direction. In each of the relevant figures, the longitudinal direction is shown by the axis Ox, while the axes Oz and Oy represent the vertical and transverse directions respectively. These axes together define a reference frame Oxyz in which "top" or "upper" are represented by the positive direction of the axis Oy, and "bottom" or "low" are represented by the negative direction of the same axis Oy.

According to a first embodiment of the wiper system 1, the adapter 29 is a one-piece assembly. In other words, this adapter is formed as a single part and the side walls 43, 45 and/or the top wall 46 cannot be separated from each other without damaging or destroying the adapter 29.

Optionally, as illustrated in FIG. 2 or 5, a longitudinal end 59 of the connection device 7, particularly the adapter 29, may be at least partially closed by an end edge 61 notably designed to prevent the accumulation of particles and debris in the connection device 7, for example at the joint between the connector and the wiper blade. Advantageously, such an end edge 61 may comprise at least one through-notch 611 for the wiper blade, for example for one of the deflectors 13 of the wiper blade 3. In the present case, such an end edge 61 is included, according to a non-exhaustive example, in a head 63 of the adapter 29. It is understood that, for the purposes of the following description, the adapter 29 may include the end edge and/or the notch 611 and/or the head 63, or otherwise, for example as shown in FIG. 4.

As shown in at least one of FIGS. 2 to 5, the first side wall 43 and the second side wall 45 of the adapter 29 comprise respectively a first orifice 47 and a second orifice 49 designed to receive the pin 23 of the drive arm 5.

The first orifice 47 extends between an inner face 431 of the first side wall 43, which is oriented towards an internal volume 500 of the adapter 29, i.e. the seat defined inside the adapter, and an outer face 432 of the first side wall 43, opposite the inner face 431 of the first side wall 43. Each orifice is radially delimited by an edge 69 forming a cylindrical envelope within the corresponding side wall. The first orifice 47 is at least designed to guide the pin 23 into the internal volume 500 of the adapter 29. For example, it may be at least partially cylindrical, for example with a circular or polygonal section. Furthermore, when the pin 23 extends through the first orifice 47, said pin may or may not be in contact with the edge 69 radially delimiting the first orifice 47.

The second orifice 49 is an orifice that extends through the thickness of the second side wall 45, opening out at least in an inner face 451 of this second side wall 45, oriented towards the internal volume 500 of the adapter 29. Advantageously, the first orifice 47 and the second orifice 49 may be coaxial and centred on the same axis, for example the rotation axis 400 of the connector 27 on the pin 23.

In the examples shown in the figures, with the exception of FIG. 8, the second orifice 49 is a through-hole that extends through the entire transverse dimension of the second side wall 45, specifically from the inner face 451 to an outer face 452 of the second side wall 45, opposite the inner face 451.

In the variant shown in FIG. 8, the second orifice 49 is a blind orifice extending through the thickness of the second side wall 45 from the inner face 451, the second orifice being delimited transversely by a bottom wall 490.

Regardless of the embodiment of the adapter, the adapter can notably be mounted on the connector rigidly connected to the blade, after which the pin is inserted into the adapter, with the blade inclined, for example at 45°, in relation to the arm so that the lug 25 does not stop against the adapter 29, after which the blade is pivoted about the axis formed by the pin so as to bring the lug opposite the side wall of the adapter.

When the wiper system 1 is assembled, the adapter 29 is thus mounted on the drive arm 5 so that the outer face 432 of the first side wall 43 bears at least partially against the second flank 17 of the drive arm 5, i.e. the flank of the drive arm 5 that is at least partially carrying the pin 23 and that is closest to the adapter 29. The pin 23 thus extends through the first orifice 47, the internal volume 500 and the second orifice 49 of the adapter 29.

The connector 27 is designed to extend at least partially into the internal volume 500 delimited by the adapter 29. Notably, the low wall 39 is arranged in the internal volume 500 such as to position the transverse hole 41 opposite the first orifice 47 and the second orifice 49 of the adapter 29. The link between the connector 27 and the adapter 29 may, by way of a non-exhaustive example, be made by elastic snap-fitting, and the inner face or faces 431, 451 of the adapter 29 may notably comprise one or more cylindrical strands 51 designed to border the first orifice 47 and/or the second orifice 49 and to cooperate with the low wall 39 of the connector 27. Advantageously, such arrangements ensure that the connector 27 engages in the adapter 29 when the wiper system 1 is assembled, so that the adapter 29, and therefore the arm rigidly connected thereto, can be pivoted relative to the connector 27 and therefore the wiper blade.

The lug 25 of the drive arm 5 extends transversely to the longitudinal direction Ox, overlapping the top wall 46 of the adapter 29, in this case in the transverse direction Oy. The lug 25 includes at least one end stop flange 53 for the adapter 29 extending vertically, opposite the second side wall 45 of the adapter 29. Where the adapter and the lug have matching transverse dimensions, the lug 25 is intended to be in contact with the side wall of the adapter opposite the drive arm, in this case the second side wall, via the end flange, in which case the adapter is sandwiched between the end flange and the flank of the nearest drive arm. Such a lug 25 is therefore intended to secure the mechanical link between the drive arm 5 and the wiper blade 3 by locking at least the movement of the adapter 29 relative to the drive arm 5 in the transverse direction Oy, i.e. in the direction of extension of the pin 23.

As mentioned, the invention relates to the standardization of connection devices 7 for wiper systems 1 to enable such devices to be used with drive arms 5 of varying shapes and sizes, and accordingly the transverse dimensions of the lug and of the adapter will not necessarily match as described above. The adapter 29 of the wiper system 1 according to the present invention is advantageously designed to lock the connection device 7 with respect to the drive arm 5 in the transverse direction Oy, regardless of any difference between the transverse dimension of the drive arm 5, and of the drive arm lug 25, and the transverse dimension of the adapter.

According to the invention, the lug 25, and more particularly an inner surface 55 of the end flange 53 of the lug 25, oriented towards the second flank 17 of the drive arm 5, can be arranged at a non-zero distance from the second side wall 45 while allowing the adapter to be locked in a transverse position with respect to the arm, unlike in the prior art. The locking of the lateral or transverse movement is achieved more specifically by cooperation of the adapter 29 with the pin 23, which allows this system to be used with an adapter having a width not explicitly designed for this type of fastening.

An example of such an assembled wiper system 1 is shown in FIG. 3. A transverse dimension 50 of the lug 25 of the drive arm 5, measured between the second flank 17 and the inner surface 55 of the end flange 53, is strictly greater than a corresponding transverse dimension 290 of the adapter 29, between the outer face 432 of the first side wall 43 and the outer face 452 of the second side wall 45. The inner surface 55 of the end flange 53 is arranged at a non-zero distance from the outer face 452 of the second side wall 45 of the adapter 29 so that there is a clearance between the end flange 53 and the second side wall 45 of the adapter 29 and that, for a conventional wiper system, the adapter 29 cannot be locked in relation to the drive arm 5 in at least one sense of the transverse direction Oy.

In order to lock the adapter 29 in the transverse direction Oy, the adapter is designed so that one of the side walls 45, in this case the second side wall, comprises at least one fastening means 57 designed to rigidly connect the adapter 29 to the drive arm 5 at least in the transverse direction Oy, in particular by engagement of the adapter 29 on the pin 23 of the drive arm 5. The fastening means 57 according to the invention are arranged in the second side wall in the vicinity of the edge 69 delimiting the second orifice 49 so as to enable cooperation with the pin 23 seated in the second orifice.

It should be noted that the fastening means 57 cooperate with a free end portion of the pin 23, i.e. a portion extending away from, or at least at a distance from, the flank of the drive arm from which the pin projects. For this purpose, the fastening means 57 are included in the side wall 43, 45 furthest away from the drive arm 5, in this case the second side wall 45.

The adapter 29 may comprise one or more fastening means 57, which may be made according to a variety of alternatives, examples of which are illustrated in FIGS. 6 to 10. It is understood that such examples are in no way limiting and that the adapter 29 may comprise combinations of such fastening means 57 that are not shown. These different alternatives may notably relate to the shape and/or material of the second side wall 45 and of the edge delimiting the second orifice 49 therein, as well as to the presence of additional members built into the second side wall 45 in the vicinity of the edge delimiting the second orifice 49 so as to ensure the engagement of the adapter 29 on the pin 23 of the drive arm 5.

The second side wall 45 may be configured such that the edge 69 delimiting the second orifice 49 has a substantially circular cylindrical shape or a substantially circular frustoconical shape. Hereinafter, the cylindrical or frustoconical shape of the edge delimiting the second orifice or the cylindrical or frustoconical shape of the second orifice are referred to interchangeably.

Where the second orifice 49 is substantially cylindrical, as illustrated in FIGS. 5 and 6, a cross-section of the second orifice 49, taken perpendicular to the transverse direction Oy, is characterised by a principal dimension 491 of the second orifice 49, in this case a diameter, that is substantially constant throughout a transverse dimension or thickness 450 of the second side wall 45 of the adapter 29. Such a principal dimension 491 is notably determined to enable the insertion of the pin 23 of the drive arm 5 during assembly of the wiper system 1.

As set out above, the first orifice 47 may be at least partially cylindrical. A cross section of the first orifice 47, taken perpendicularly to the transverse direction Oy, is defined by at least one principal dimension 471 of the first orifice 47, in this case a diameter, which may, for example, be equal to or greater than the principal dimension 491 of the second orifice 49 to ensure that the pin actually passes through the first orifice to cooperate with the second orifice, after passing through the low wall of the connector (not shown in FIGS. 5 and 6).

Where the second orifice 49 is substantially frustoconical, as illustrated in FIGS. 7 and 8, the second orifice 49 is defined by at least a first principal dimension 4911 and a second principal dimension 4912 that is smaller than the first principal dimension. Notably, the first principal dimension 4911 is characteristic of a first cross section of the second orifice 49, measured in the plane defined by the longitudinal direction Ox and the vertical direction Oz, in line with the inner face 451 of the second side wall 45. The second principal dimension 4912 is characteristic of a second cross section, measured in the plane defined by the longitudinal direction Ox and the vertical direction Oz, opposite the inner face 451, and this second cross section may be taken level with the outer face 452 of the second side wall 45 of the adapter 29 when the second orifice 49 is a through-hole as illustrated in FIG. 7 or level with the bottom wall 490 where the second orifice 49 is a blind hole as illustrated in FIG. 8.

In this case, the second orifice 49 has substantially circular first and second cross sections and the principal dimensions 4911, 4912 are the diameters of said cross sections.

Similarly to the foregoing, the first orifice 47 may be at least partially cylindrical. A cross section of the first orifice 47 taken perpendicular to the transverse direction Oy is defined by a principal dimension 471, such as a diameter or a diagonal, which may, by way of non-exhaustive example, be substantially equal to or greater than the first principal dimension 4911 of the first cross section of the second orifice 49.

As mentioned above, the adapter has at least one fastening means 57 on the second side wall 45. These fastening means 57 are elastically deformable. In other words, the fastening means 57 is designed to deform under the effect of inserting the pin 23 into the second orifice 49, so as to allow the pin to pass through, and to return to an original position while engaging the pin, so as to transversely lock the pin by radial compression of the fastening means on the pin.

According to a first example embodiment shown for example in FIGS. 4 and 6, which is described in greater detail below with reference to FIG. 9, this at least one fastening means 57 may be arranged on the outer face 452 of the second side wall 45, at the join with the edge 69 delimiting the second orifice 49.

Notably, the adapter 29 can be made at least partially of a synthetic material, such as a polymer material with more or less elastic properties, for example a thermoplastic polymer, such as polyoxymethylene, fiber-reinforced acrylonitrile butadiene styrene (ABS) or filled polybutylene terephthalate (PBT), depending on the desired degree of elasticity.

In the above example of a second frustoconical orifice, the reduction in section forms a narrowing portion 65, at the second principal dimension 4912, constituting a second example of the at least one fastening means 57.

More specifically, the second principal dimension 4912 has a slightly smaller value than the corresponding dimension, specifically the cross section in a plane perpendicular to the transverse direction, of the pin 23, so that at least the narrowing portion 65, facing outwards from the adapter 29, is engaged on the pin 23. Specifically, at least the narrowing portion 65 is shaped to match the pin 23.

With reference to a second frustoconical orifice, insertion of the pin tends to elastically deform the second side wall when the free end of the pin is close to the narrowing portion, enlarging the second principal dimension 4912 of the edge 69 delimiting the second orifice, and the degree of elasticity of the selected material enables the edge delimiting the second orifice to tighten about the pin and to lock the pin in position, in the narrowing portion constituting at least one fastening means.

Furthermore, and regardless of the shape of the second orifice 49, the second side wall 45 may comprise one or more fastening means 57 according to other embodiments, as shown schematically and in a non-limiting manner, in FIGS. 9 and 10.

The fastening means 57 are in these cases arranged in the outer face 452 of the second side wall 45, for example in the periphery more or less close to the edge 69 delimiting the second orifice 49.

FIG. 9 shows the fastening means 57 according to the first example embodiment mentioned above, which is in the form of a resilient clamping ring 70 made in the material of the second side wall. More specifically, the second side wall 45 comprises, at the join of the outer face 452 and the edge 69 delimiting the second orifice, at least one notch 67 that extends from the edge 69 delimiting the second orifice radially in relation to the axis of this orifice, and that helps to form this resilient clamping ring designed to grip, by elastic deformation, the free end portion of the pin 23.

As illustrated, the resilient clamping ring 70 is notably formed by a plurality of slats 73 separated from each other by at least one notch 67 and made flexible by the presence of a peripheral groove 71.

More specifically, the at least one notch 67 has a substantially parallelepiped shape and extends through the resilient clamping ring 70 arranged in the second side wall, in the outer face 452 thereof and about the entire second orifice 49. In this case, this clamping ring forming the fastening means 57 comprises four notches 67 distributed at regular angular intervals. These notches 67 extend inwards from an outer plane 455 substantially containing the outer face 452 of the second side wall 45 into the thickness 450 of the second side wall 45. The number, shape and position of the notches 67 shown in FIG. 9 are in no way limiting and may be altered.

The resilient clamping ring 70 is delimited radially, with respect to the axis of the second orifice, by the groove 71 that extends about the entire edge 69 delimiting the second orifice 49 and that defines at least one slat 73 between this groove 71 and the second orifice 49, each slat being separated from a neighbouring slat by a notch 67, each notch extending radially from the edge 69 delimiting the second orifice to the groove 71.

The projecting profile of each of the slats 73, resulting from the positioning thereof between the groove 71 and the second orifice 49, may be designed such that each of these slats 73 is at least partially flush with the outer face 452 of the second side wall 45, for example so as to be partially included in the outer plane 455.

In this case, the fastening means 57 therefore comprise four slats 73, each of which is partially delimited by two notches 67. As set out above, the number, shape and position of the groove 71 and/or the slats 73 shown in FIG. 9 are in no way limiting and may be altered.

When the pin is inserted in the second side wall, the slats 73 tend to move away radially, in the direction of the groove 71, to allow the free end portion of the pin 23 to pass through, and the elasticity thereof, accentuated by the angular cut-out made by the notches, tends to move the slats back towards the axis of the second orifice and to ensure the pin is held by radial compression.

According to a third example embodiment of the fastening means 57, said means may comprise, either alternatively as illustrated in FIG. 10, or in combination with the previously described resilient clamping ring, at least one flexible tab 75 extending across the second orifice 49, forming a radial projection from the edge 69 delimiting the second hole 49.

The tab 75 has an elongate shape, and notably, but not necessarily, a substantially parallelepiped shape. The tab extends radially from the edge 69 delimiting the second orifice, in this case at the join between this edge and the outer surface 452 of the second side wall 45, for example towards the rotation axis 400. The tab 75 is thin and can be deformed, for example elastically, firstly to enable the pin 23 to be inserted through the second orifice 49, and secondly to ensure that said pin 23 is gripped, by elastic return, once the wiper system 1 is assembled.

The second side wall 45 may therefore comprise one or more fastening means 57 that may, for example, comprise a combination of a narrowing portion 65 and/or at least one resilient clamping ring 70 and/or at least one tab 75. As set out above, each of these alternative embodiments of the adapter 29 may also be at least partially made of an elastically deformable material so as to optimise the function of fastening the pin using the second side wall 45 and the related fastening means 57.

Specifically, the adapter 29 may be made in one piece by injection molding of several materials with different elasticity characteristics, the at least one resilient clamping ring 70 and/or the at least one tab 75 being made of a material that is more elastic than the rest of the adapter.

As mentioned above, when assembling the wiper system 1, the drive arm 5 is mounted on the connection device 7. The pin 23 is engaged in the first orifice 47, then in the transverse hole 41 of the connector 27, which extends into the internal volume 500 of the adapter 29, before being inserted through the second orifice 49 by means of a translational movement in the transverse direction Oy until the second lateral flank 17 of the drive arm 5 is bearing against the outer face 432 of the first side wall 43 of the adapter 29, as illustrated in FIG. 3. In this position, the at least one fastening means 57 included in the second side wall 45 helps to lock the connection device 7 in the transverse direction Oy by continuing to engage the pin 23 of the drive arm 5 through the second side wall 45. The drive arm 5 is then pivoted downwards about the pivot axis 300 so as to move the lug 25 towards the connection device 7 until the end flange 53 of the lug 25 is facing the outer face 452 of the second side wall 45.

To disassemble the wiper blade 3 fitted with the connection device 7 of the drive arm, the steps of the assembly sequence described above need simply be carried out in reverse order.

FIGS. 11 to 17 are different views of a second embodiment of the wiper system 1, which is substantially identical to the second embodiment, and as such the description given above can be applied mutatis mutandis. The present embodiment differs from the first embodiment in that the adapter 29 comprises a plurality of parts, notably at least one primary element 77 and one secondary element 79, attached to the primary element 77 and engaged with said primary element 77.

The primary element 77 has a first primary side wall 771 and a second primary side wall 772 that are spaced apart from each other and joined together by a primary top wall 773.

Similarly, the secondary element 79 has a first secondary side wall 791 and a second secondary side wall 792 that are spaced apart from each other and joined together by a secondary top wall 793.

The primary element 77 and the secondary element 79 are thus designed to cooperate such that the first side wall 43 of the adapter 29 comprises at least the first primary side wall 771 and the first secondary side wall 791, while the second side wall 45 of the adapter 29 comprises at least the second primary side wall 772 and the second secondary side wall 792, and the top wall 46 of the adapter 29 comprises the primary top wall 773 and the secondary top wall 793. In other words, the primary element 77 comprises the inner face 431 of the first side wall 43 and the inner face 451 of the second side wall 45 as set out above, while the secondary element 79 comprises the outer face 432 of the first side wall 43 and the outer face 452 of the second side wall 45. The secondary element 79 overlaps the primary element 77, each having at least partially matching profiles.

Similarly, the first secondary side wall 791 and the second secondary side wall 792 of the secondary element 79 comprise respectively intermediate inner faces 794, 794', opposite the outer faces 432, 452 of the secondary element 79. Similarly, the first primary side wall 771 and the second primary side wall 772 of the primary element 77 respectively comprise intermediate outer faces 774, 774', opposite the inner faces 431, 451 of the adapter 29, the intermediate inner faces 794, 794' of the secondary element 79 being at least partially in contact with the intermediate outer faces 774, 774' of the primary elements 77. The cooperation between the primary element 77 and the secondary element 79 is further detailed below.

Such an arrangement of the adapter 29 enables the adapter to be made of different materials. Notably, in order to strengthen the structure of the adapter 29 while providing the aforementioned function of locking the pin in the transverse direction, either the primary element 77 or the secondary element 79 may be made of a substantially rigid thermoplastic polymer material while the other may be made of a softer material having higher elastic deformation properties than the thermoplastic element. By way of non-exhaustive example, at least the element of the adapter 29 comprising the at least one fastening means 57, in this case the secondary element 79, is made of an elastically deformable polymeric material.

All of the features set out above in the first embodiment with respect to the second orifice 49 can be transposed mutatis mutandis to the present embodiment, with the difference that, instead of a second orifice 49 formed integrally in the thickness 450 of the second side wall 45, the second orifice 49 of the adapter 29 according to the second embodiment comprises a first portion 81 of the second orifice 49, included in the second primary side wall 772 of the primary element 77, and a second portion 83 of the second orifice 49, included in the second secondary side wall 792 of the secondary element 79. Said first portion 81 of the second orifice 49 and said second portion 83 of the second orifice 49 are arranged at least partially opposite each other when the secondary element 79 is arranged to overlap the primary element 77, so as to form a continuous orifice designed to receive the pin 23 of the drive arm 5. Specifically, they may be centred on the same axis, for example the rotation axis 400 of the connector 27 on the adapter 29.

Moreover, the first portion 81 of the second orifice 49 and the second portion 83 of the second orifice 49 may be designed such that the second orifice 49 has a substantially cylindrical shape, as specified above with reference to FIG. 6, or a frustoconical shape, as set out above with reference to FIGS. 7 and 8. Similarly, the second portion 83 of the second orifice 49 and/or the second secondary side wall 792 of the secondary element 79 of the adapter 29 may comprise any one of the example embodiments of the at least one fastening means 57 described above with reference to FIGS. 7 to 10. According to an example that is not shown, the second portion 83 of the second orifice 49 may comprise the narrowing portion 65 of the fastening means 57.

Similarly to the first embodiment, the adapter 29 may optionally comprise the end edge 61 at the longitudinal end 59 thereof. Advantageously, such an end edge 61 may comprise a primary end edge 612, included in the primary element 77, and/or a secondary end edge 613, which at least partially matches and at least partially surrounds the primary end edge 611. The same applies to the notch 611 and/or the head 63 as described above, which may be transposed so as to be integrated into the primary element 77 and/or the secondary element 79.

The adapter 29 may therefore comprise an end edge 61 including the primary end edge 611 alone, or in combination with the secondary end edge 613, as shown in FIGS. 11 to 13, or may be open at the longitudinal end 59 thereof, as shown in FIG. 16.

To keep the primary element 77 and the secondary element 79 rigidly connected to one another, notably in the longitudinal direction Ox, the primary element 77 comprises at least one locking member 85 and the secondary element 79 comprises at least one complementary locking means 87 designed to cooperate with at least the locking member 85.

Advantageously, the adapter 29 may comprise a plurality of locking members 85 and complementary locking means 87, different examples of which are shown in FIGS. 11 to 17. These may have similar structures or different structures, as illustrated. The adapter 29 may be designed to include only some of the different locking members 85 and complementary locking means 87 shown in said figures.

A first example of a locking member 85 according to the invention consists of at least one locking rib 89, which may project from the primary top wall 773 or more specifically, for example as illustrated in FIGS. 11 and 12, from an undercut made in the primary top wall 773. In the example shown, the locking member 85 extends in the longitudinal direction Ox. Alternatively, such a locking rib 89 may extend in the transverse direction Oy. Advantageously, the primary element 77 of the adapter 29 comprises a plurality of locking ribs 89.

The secondary element 79 comprises at least one complementary locking means 87 designed to cooperate with the locking ribs 89 so as to stop the secondary element 79 from moving at least in the longitudinal direction Ox. In this case, the secondary element 79 comprises a window 91 into which at least one of the locking ribs 89 extends and that has at least one peripheral edge 93 that is designed to form a stop for said locking rib 89 in the longitudinal direction Ox. In this case, the secondary element 79 comprises a window 91 into which the various locking ribs 89 extend.

A second example locking member 85 may for example consist of at least one spotface, referred to as the primary spotface 95, of the primary element 77, which may be formed in the first primary side wall 771 and/or in the second primary side wall 772 and/or in the primary top wall 773. Such a primary spotface 95 is designed to cooperate with at least one complementary locking means 87 included in the secondary element 79, in this case a spotface of matching shape referred to as the secondary spotface 97, as shown for example in FIG. 13 or FIG. 17.

A third example complementary locking means for the secondary element 79 may consist of at least one secondary tooth 99, shown in FIG. 11 or in FIG. 17, projecting from at least one of the intermediate inner faces 794, 794' of the first secondary side wall 791 and/or of the second primary side wall 772 so as to extend towards the internal volume 500 of the adapter 29, i.e. towards the primary element 77 of the adapter 29. Such a secondary tooth 99 may, by way of non-exhaustive example, be designed to cooperate with at least one locking member 85 comprising a primary slot 101 of matching shape opening into at least one of the intermediate outer faces 774, 774' of the first primary side wall 771 and/or of the second primary side wall 772 of the primary element 77, arranged opposite the secondary tooth 99.

According to one specific embodiment of the wiper system 1 according to the second embodiment, an example of which is illustrated in FIG. 17, where at least the secondary element 79 has an open longitudinal end 59, i.e. having no end edge 61, said element can advantageously be designed so that the at least one complementary locking means 87 extend symmetrically on both sides of a vertical and transverse median plane 250 of the secondary element 79, orthogonal to the longitudinal axis 100 of the secondary element 79.

Such an arrangement advantageously enables the secondary element 79 on the primary element 77 to be reversible. In other words, the aforementioned secondary element 79 can be disassembled from the secondary element 79, rotated 180° about the vertical direction Oz, and then reassembled on the primary element 77 so that the first primary side wall 771 is opposite the second secondary side wall 792 and the second primary side wall 772 is opposite the first secondary side wall 791. Consequently, the connection device 7 of the wiper system 1 according to the invention can also be used with a drive arm 5 designed to be arranged opposite the adapter 29 in the transverse direction Oy, for example on the other side of the outer plane 455 of the second side wall 45, instead of the position adopted by the drive arm 5 as previously described.

In such an inverted layout (not shown), the first side wall 43 of the adapter 29 then comprises the second primary side wall 772 of the primary element 77, as previously specified, and the first secondary side wall 791 of the secondary element 79, while the second side wall 45 of the adapter 29 comprises the first primary side wall 771 and the second secondary side wall 792. In other words, the second side wall 45 of the adapter 29 is the wall of the adapter 29 comprising the second secondary side wall 792, i.e. the side wall that may comprise, at least in part, the fastening means 57. Similarly, the orifice comprising the second portion 83 that may comprise, at least in part, the fastening means 57 is referred to as the second orifice 49.

Such an arrangement is therefore suitable for drive arms 5 designed to face the second primary side wall 772 and not the first side wall comprising the first primary side wall as set out above. Similarly to the foregoing, the at least one fastening means 57 is included in the side wall of the adapter 29 furthest away from the drive arm 5.

As illustrated in FIG. 17, the adapter 29 may comprise a plurality of complementary locking means 87, including at least a first complementary locking means 871 and a second complementary locking means 872, arranged symmetrically in relation to one another about the median plane 250, perpendicular to the longitudinal axis Ox, of the secondary element 79. The first complementary locking means 871 and the second complementary locking means 872 may be made according to any of the embodiments as previously described, i.e. said means may consist of a plurality of windows 91 and/or secondary spotfaces 97 and/or secondary teeth 99 or any other alternative of said example embodiments as described above. In this case, in the example secondary element 79 shown in FIG. 17, the first complementary locking means 871 and the second complementary locking means 872 consist of secondary teeth 99.

In accordance with the foregoing, the present invention provides an adapter, in a connection device of a wiper system, that is designed to fit a plurality of different drive arms, including in particular side-lock drive arms, i.e. comprising at least one rotation pin of the drive device extending transversely to a longitudinal direction of said arm. The adapter of the connection device therefore comprises at least a first side wall and a second side wall each having a first orifice and a second orifice designed to receive the pin of the drive arm and the second side wall comprises at least one fastening means designed to lock the adapter at least in the transverse direction Oy relative to the pin of the drive arm.

However, the invention is by no means limited to the means and configurations described and illustrated herein, and it also extends to any equivalent means or configuration and to any technically operational combination of such means. In particular, the shape and/or dimensions of the adapter of the connection device, or of the locking members and/or complementary locking means, can be modified without prejudice to the invention, as long as these components ultimately fulfil the same functions as the components described in this document.

The invention claimed is:

1. An adapter for a connection device configured to connect a wiper blade to a drive arm in a wiper system for a motor vehicle, comprising:
    a first side wall and a second side wall spaced apart from each other and connected to each other by a top wall,
    the first side wall and the second side wall comprising respectively a first orifice and a second orifice that are designed to receive a pin projecting from the drive arm in a transverse direction,
    wherein the second side wall comprises at least one fastening means for fastening the pin in the second orifice configured to rigidly connect the adapter to the drive arm at least in the transverse direction,
    wherein the at least one fastening means comprises a narrowing portion of the second orifice, the second orifice having a substantially frustoconical shape and being defined by at least a first principal dimension of the second orifice and a second principal dimension of the narrowing portion, measured respectively at an inner face and an outer face of the second side wall, the first principal dimension being greater than the second principal dimension.

2. A connection device configured to connect a wiper blade to a drive arm in a wiper system for a motor vehicle, the connection device comprising:
    at least one connector configured to be rigidly connected to the wiper blade and including at least one transverse hole configured to receive a pin; and
    an adapter as claimed in claim 1 that is mounted pivotingly about a rotation axis on the connector to link the connector to the drive arm.

3. A wiper system for a motor vehicle comprising:
    a wiper blade;
    a drive arm; and
    a connection device as claimed in claim 2,
    the drive arm having at least one pin and one lug, both of which project from an end portion of the drive arm in a transverse direction.

4. The wiper system as claimed in claim 3, in which the end portion of the drive arm has at least a first flank and a second flank, at least the second flank carrying the pin and the second flank bearing at least partially against an outer face of the first side wall of the adapter.

5. The wiper system as claimed in claim 3, in which the lug includes at least one end stop flange for the adapter arranged opposite the second side wall of the adapter.

6. The wiper system as claimed in claim 5, in which the lug is defined by a transverse dimension, measured between the second flank and an inner surface of the end flange, the transverse dimension being strictly greater than a corresponding transverse dimension of the adapter measured between an outer face of the first side wall and the outer face of the second side wall, the inner surface of the end flange being arranged at a non-zero distance from the outer face of the second side wall of the adapter.

7. A motor vehicle having a wiper system as claimed in claim 3.

* * * * *